United States Patent
Yang et al.

(10) Patent No.: US 9,504,029 B2
(45) Date of Patent: Nov. 22, 2016

(54) METHOD FOR SIGNALING CONTROL INFORMATION, AND APPARATUS THEREFOR

(71) Applicant: LG ELECTRONICS INC., Seoul (KR)

(72) Inventors: Suckchel Yang, Anyang-si (KR); Joonkui Ahn, Anyang-si (KR); Bonghoe Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 65 days.

(21) Appl. No.: 14/418,855

(22) PCT Filed: Aug. 1, 2013

(86) PCT No.: PCT/KR2013/006956
§ 371 (c)(1),
(2) Date: Jan. 30, 2015

(87) PCT Pub. No.: WO2014/021662
PCT Pub. Date: Feb. 6, 2014

(65) Prior Publication Data
US 2015/0156764 A1 Jun. 4, 2015

Related U.S. Application Data

(60) Provisional application No. 61/678,600, filed on Aug. 1, 2012, provisional application No. 61/750,306, filed on Jan. 8, 2013, provisional application No. 61/822,310, filed on May 11, 2013, provisional application No. 61/807,785, filed on Apr. 3, 2013.

(51) Int. Cl.
*H04W 4/00* (2009.01)
*H04W 72/04* (2009.01)
(Continued)

(52) U.S. Cl.
CPC .......... *H04W 72/042* (2013.01); *H04L 1/0076* (2013.01); *H04L 1/1671* (2013.01);
(Continued)

(58) Field of Classification Search
None
See application file for complete search history.

(56) References Cited

U.S. PATENT DOCUMENTS 9,060,357 B2 * 6/2015 Ji .................. H04W 72/0406
9,402,253 B2   7/2016 Yang et al.
(Continued)

FOREIGN PATENT DOCUMENTS

KR   1020060100451   9/2006
KR   1020110081954   7/2011
(Continued)

OTHER PUBLICATIONS

NEC Group, "Support of different TDD UL-DL configurations on different bands," 3GPP TSG RAN WG1 Meeting #68bis, R1-121328, Mar. 2012, 7 pages.
(Continued)

*Primary Examiner* — Michael J Moore, Jr.
(74) *Attorney, Agent, or Firm* — Lee Hong Degerman Kang Waimey

(57) ABSTRACT

The present invention relates to a wireless communication system. In detail, the invention relates to a method for a terminal to transmit a UCI in a carrier aggregation-based wireless communication system, and to an apparatus therefor, wherein the method involves the steps of: forming a first cell group having a PCell; forming a second cell group having one or more SCells; receiving one or more data in the second cell group; and transmitting HARQ-ACK information on the one or more data through a PUCCH, wherein, when the first and second cell groups are managed by an identical base station, the HARQ-ACK information is transmitted in the PCell, and, when the first and second cell groups are managed by different base stations, the HARQ-ACK information is transmitted in the second cell group.

10 Claims, 15 Drawing Sheets

*Signaling path may be limited to CC1 (group) or CC2 (group) according to signaling type

(51) Int. Cl.
*H04L 1/00* (2006.01)
*H04L 1/18* (2006.01)
*H04L 1/16* (2006.01)
*H04L 5/00* (2006.01)

(52) U.S. Cl.
CPC ........... *H04L1/1812* (2013.01); *H04L 5/0032* (2013.01); *H04L 5/0055* (2013.01); *H04W 72/0413* (2013.01)

(56) References Cited

U.S. PATENT DOCUMENTS

| | | | |
|---|---|---|---|
| 2011/0249641 A1 | 10/2011 | Kwon et al. | |
| 2012/0135741 A1 | 5/2012 | Zhou et al. | |
| 2012/0257513 A1* | 10/2012 | Yamada | H04L 1/0618 370/248 |
| 2012/0263147 A1 | 10/2012 | Takahashi et al. | |
| 2013/0003668 A1 | 1/2013 | Xiao et al. | |
| 2013/0301433 A1* | 11/2013 | Yin | H04W 16/02 370/252 |
| 2013/0308550 A1* | 11/2013 | Yin | H04L 5/001 370/329 |
| 2014/0192775 A1* | 7/2014 | Li | H04W 36/0072 370/331 |
| 2015/0098441 A1* | 4/2015 | Peng | H04W 72/042 370/330 |
| 2015/0358924 A1* | 12/2015 | Papasakellariou | H04W 52/346 370/329 |

FOREIGN PATENT DOCUMENTS

| | | |
|---|---|---|
| KR | 10-2012-0081033 | 7/2012 |
| KR | 1020120083863 | 7/2012 |
| WO | 2012/094151 | 7/2012 |

OTHER PUBLICATIONS

NTT Docomo, "PDSCH HARQ Timing of SCell and PUCCH Collision for Cross-Carrier Scheduling," R1-121972, 3GPP TSG RAN WG1 Meeting #69, May 2012, 4 pages.

Samsung, "Cross-Carrier scheduling of PUSCH for TDD CA," R1-120160, 3GPP TSG RAN WG1 #68, Feb. 2012, 3 pages.

PCT International Application No. PCT/KR2013/006956, Written Opinion of the International Searching Authority dated Nov. 27, 2013, 21 pages.

U.S. Appl. No. 14/416,940, Notice of Allowance dated Mar. 22, 2016, 12 pages.

PCT International Application No. PCT/KR2013/006958, Written Opinion of the International Searching Authority dated Nov. 15, 2013, 19 pages.

Renesas Mobile Europe, "Multiple timing advance using multiple RACH", R2-113014, 3GPP TSG-RAN WG2 Meeting #74, May 2011, 3 pages.

United States Patent and Trademark Office U.S. Appl. No. 15/192,667, Office Action dated Aug. 17, 2016, 12 pages.

* cited by examiner

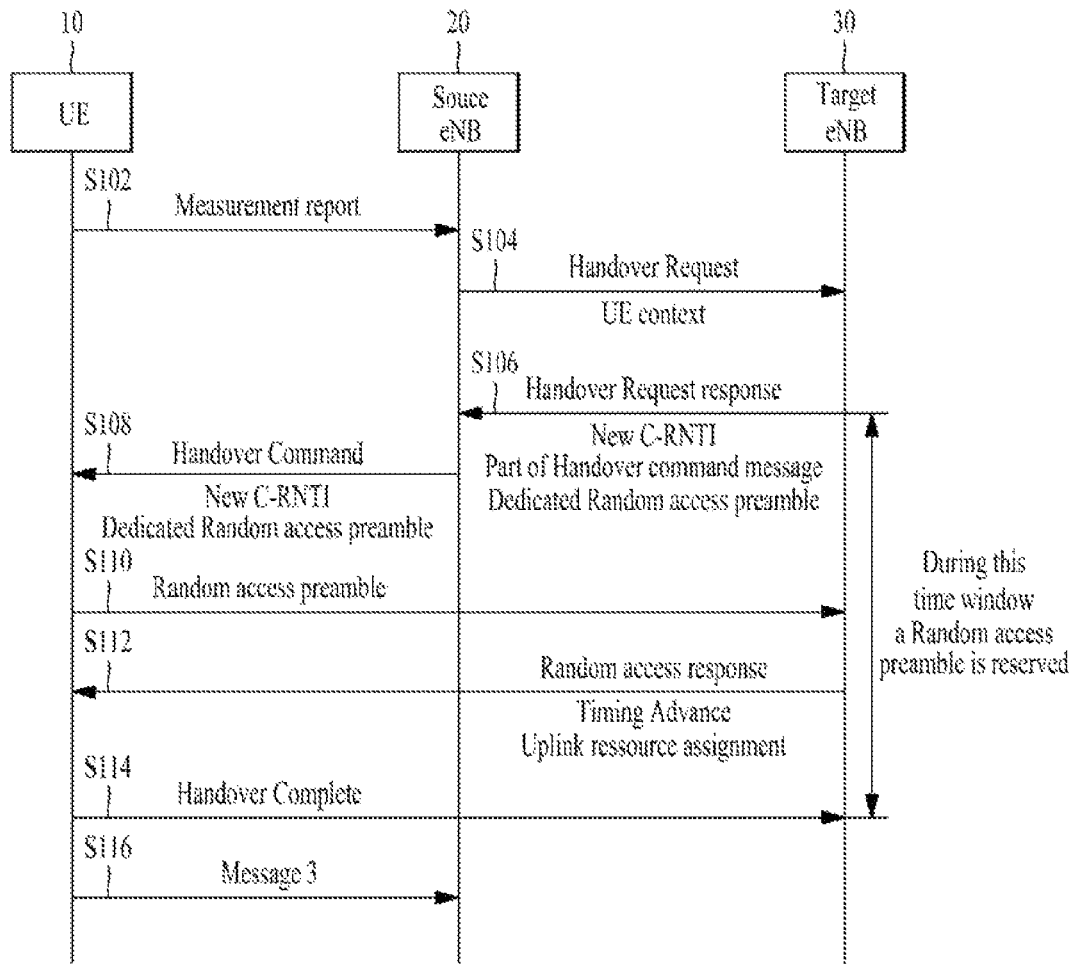
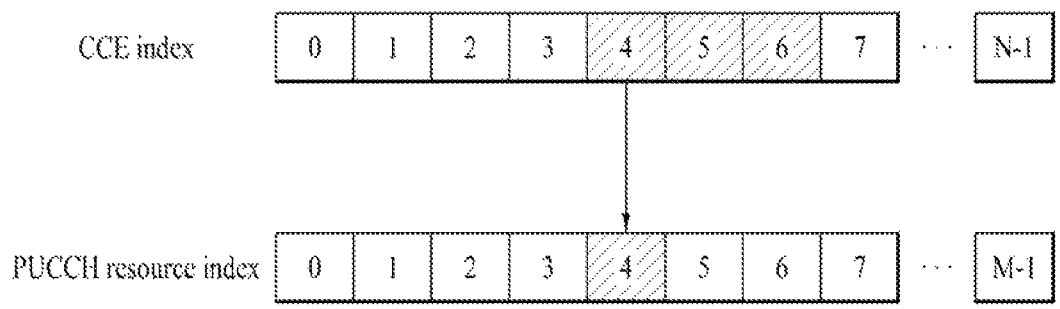

*Signaling path may be limited to CC1 (group)
or CC2 (group) according to signaling type

METHOD FOR SIGNALING CONTROL INFORMATION, AND APPARATUS THEREFOR

CROSS-REFERENCE TO RELATED APPLICATIONS

This application is the National Stage filing under 35 U.S.C. 371 of International Application No. PCT/KR2013/006956, filed on Aug. 1, 2013, which claims the benefit of U.S. Provisional Application Ser. Nos. 61/678,600, filed on Aug. 1, 2012, 61/750,306, filed on Jan. 8, 2013, 61/807,785, filed on Apr, 3, 2013, and 61/822,310, filed on May 11, 2013, the contents of which are all hereby incorporated by reference herein in their entirety.

TECHNICAL FIELD

The present invention relates to a wireless communication system, and more particularly, to a method and apparatus for signaling control information.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention devised to solve the conventional problem is to provide a method and apparatus for efficiently transmitting/receiving control information in a wireless communication system, particularly a method and apparatus for efficiently transmitting/receiving control information in inter-site Carrier Aggregation (CA).

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for transmitting Uplink Control Information (UCI) by a User Equipment (UE) in a wireless communication system based on carrier aggregation includes configuring a first cell group having a Primary Cell (PCell), configuring a second cell group having one or more Secondary Cells (SCells), receiving one or more data in the second cell group, and transmitting Hybrid Automatic Repeat reQuest (HARQ)-ACKnowledgment (ACK) information for the one or more data on a Physical Uplink Control Channel (PUCCH). If the first cell group and the second cell group are managed by the same Base Station (BS), the HARQ-ACK information is transmitted in the PCell, and if the first cell group and the second cell group are managed by different BSs, the HARQ-ACK information is transmitted in the second cell group.

In another aspect of the present invention, a UE for transmitting UCI in a wireless communication system based on carrier aggregation includes a Radio Frequency (RF) unit, and a processor. The processor is configured to configure a first cell group having a PCell, configure a second cell group having one or more SCells, receive one or more data in the second cell group, and transmit HARQ-ACK information for the one or more data on a PUCCH. If the first cell group and the second cell group are managed by the same Base Station (BS), the HARQ-ACK information is transmitted in the PCell, and if the first cell group and the second cell group are managed by different BSs, the HARQ-ACK information is transmitted in the second cell group.

If the first cell group and the second cell group are managed by different BSs, the HARQ-ACK information may be transmitted in a SCell of the second cell group, in which the one or more data have been received.

If the first cell group and the second cell group are managed by different BSs, the HARQ-ACK information may be transmitted in a SCell predetermined for HARQ-ACK transmission in the second cell group.

If the first cell group and the second cell group are managed by the same BS and data is received in two or more SCells of the second cell group, whole HARQ-ACK information for the two or more SCells may be transmitted in the PCell.

If the first cell group and the second cell group are managed by different BSs and data is received in two or more SCells of the second cell group, HARQ-ACK information for each of the SCells may be transmitted in the SCell.

Advantageous Effects

According to the present invention, control information can be efficiently transmitted/received in a wireless communication system. Particularly, control information can be efficiently transmitted/received in inter-site CA.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 10 is a diagram illustrating a signal flow for a handover procedure;

FIG. 11 illustrates an example of determining PUCCH resources for Acknowledgement/Negative Acknowledgement (ACK/NACK) transmission;

BEST MODE FOR CARRYING OUT THE INVENTION

The following techniques disclosed below may be used for various radio access systems such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, adopting OFDMA for Downlink (DL) and SC-FDMA for Uplink (UL). LTE-Advanced (LTE-A) is an evolved version of 3GPP LTE.

The embodiments of the present invention will be described below in the context that the technical features of the present invention are applied to a 3GPP LTE/LTE-A system, for the clarity of description. However, it should not be constructed as limiting the present invention. Specific terms as used herein are provided to help understanding of the present invention and may be replaced with other terms without departing the scope of the present invention.

Terms used in the present disclosure will first be described.

Figure 1:
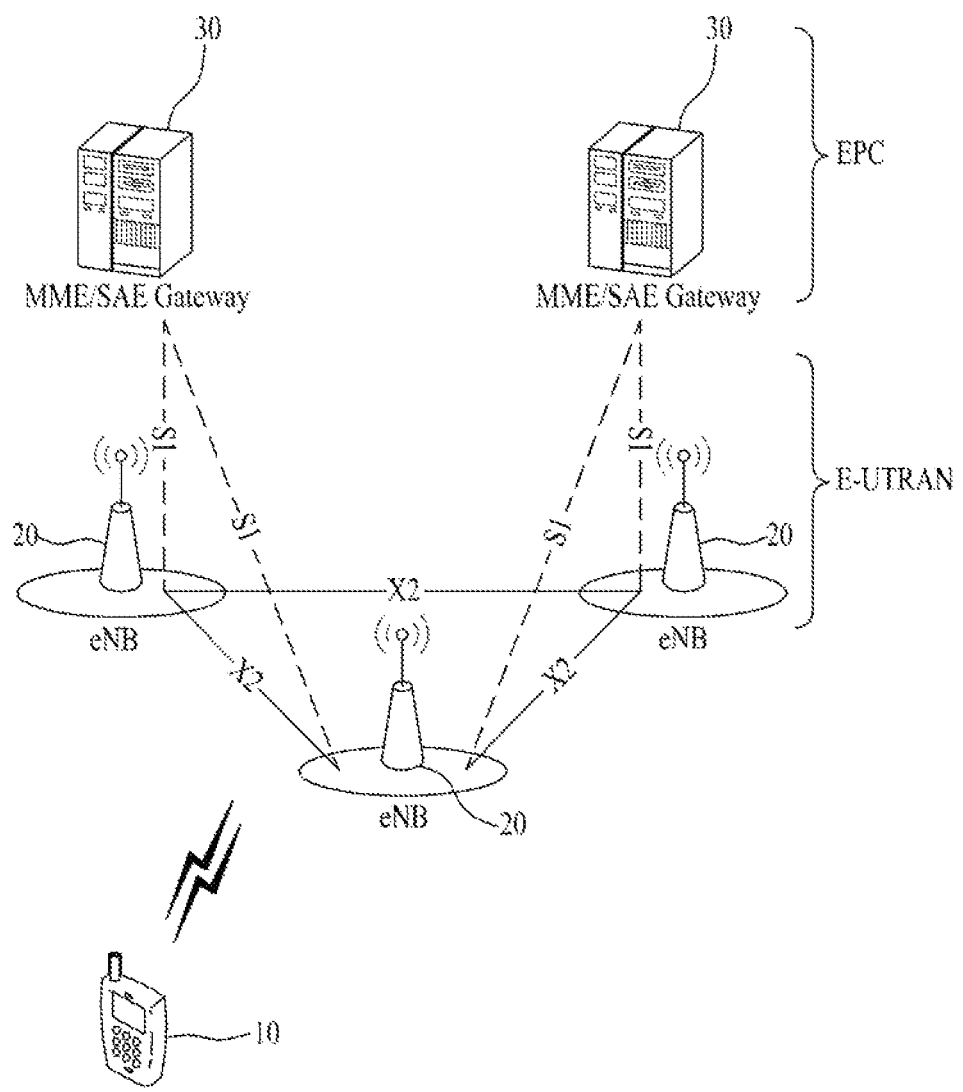
FIG. 1 illustrates a configuration of an Evolved Universal Mobile Telecommunications System (E-UMTS) network.

FIG. 1 illustrates a configuration of an E-UMTS network. The E-UMTS is also called an LTE system. A communication network is widely deployed and provides various communication services such as voice and packet data.

Referring to FIG. 1, the E-UMTS network includes an Evolved Universal Terrestrial Radio Access Network (E-UTRAN), an Evolved Packet Core (EPC), and one or more User Equipments (UEs). The E-UTRAN may include one or more evolved Node Bs (eNBs) 20 and a plurality of UEs 10 may be located in one cell. One or more E-UTRAN Mobility Management Entity/System Architecture Evolution (MME/SAE) gateways 30 may be located at an end of the network and connected to an external network. DL refers to communication directed from an eNB 20 to a UE 10 and UL refers to communication directed from a UE 10 to an eNB 20.

A UE 10 is a communication device carried by a user and referred to as a Mobile Station (MS), a User Terminal (UT), a Subscriber Station (SS), or a wireless device. An eNB 20 is generally a fixed station that communicates with a UE and referred to as an Access Point (AP). The eNB 20 provides user-plane and control-plane end points to the UE 10. One eNB 20 may be deployed in each cell. An interface for transmitting user traffic or control traffic may be used between eNBs 20. An MME/SAE gateway 30 provides an end point of a session and mobility management function to the UE 10. The eNB 20 and the MME/SAE gateway 30 may be connected to each other via an S1 interface.

An MME provides various functions including distribution of paging messages to the eNBs 20, security control, idle-state mobility handling, SAE bearer control, and cyphering and integrity protection of Non Access Stratum (NAS) signaling. An SAE gateway host provides various functions including plane-packet termination and user-plane switching to support the mobility of the UEs 10. The MME/SAE gateway 30 will be referred to shortly as a gateway. However, it is to be understood that the MME/SAE gateway 30 covers both the MME and the SAE gateway.

A plurality of nodes may be connected via an 51 interface between an eNB 20 and a gateway 30. eNBs 20 may be connected to one another via X2 interfaces and adjacent eNBs 20 may be configured in a mesh network with X2 interfaces.

Figure 2:
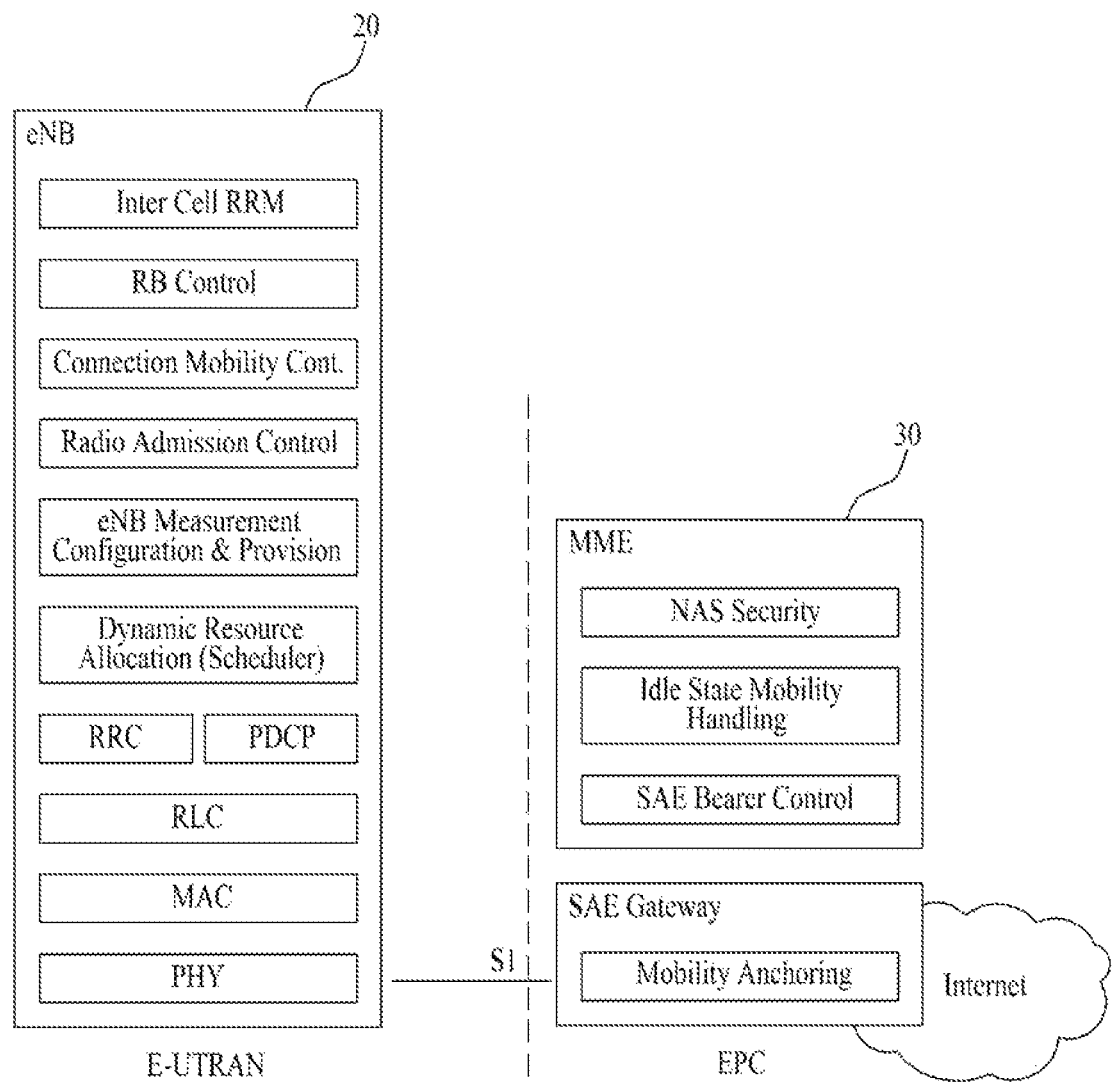
FIG. 2 illustrates configurations of an Evolved Universal Terrestrial Radio Access Network (E-UTRAN) and a gateway.

FIG. 2 illustrates configurations of a general E-UTRAN and a general gateway 30. Referring to FIG. 2, an eNB 20 may perform functions such as selection of a gateway 30, routing to a gateway during Radio Resource Control (RRC) activation, scheduling and transmission of a paging message, scheduling and transmission of Broadcast Channel (BCCH) information, dynamic UL/DL resource allocation to UEs 10, configuration and preparation of eNB measurement, radio bearer control, Radio Admission Control (RAC), and connection mobility control in LTE_ACTIVE state. The gateway 30 may perform functions such as paging transmission, LTE_IDLE state management, user-plane encryption, SAE bearer control, and ciphering and integrity protection of NAS signaling.

Figure 3A:
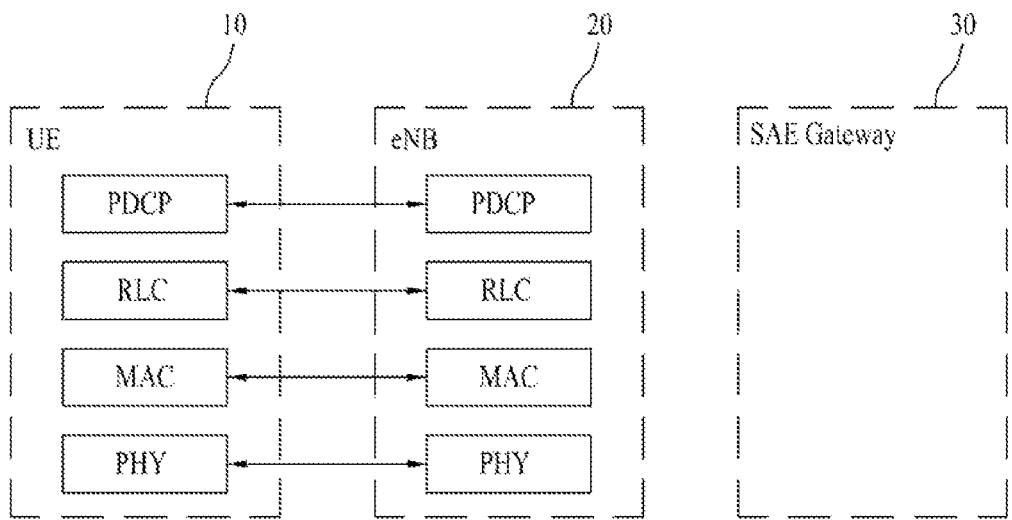
FIGS. 3A and 3B illustrate exemplary user-plane and control-plane protocol stacks.
Figure 3B:
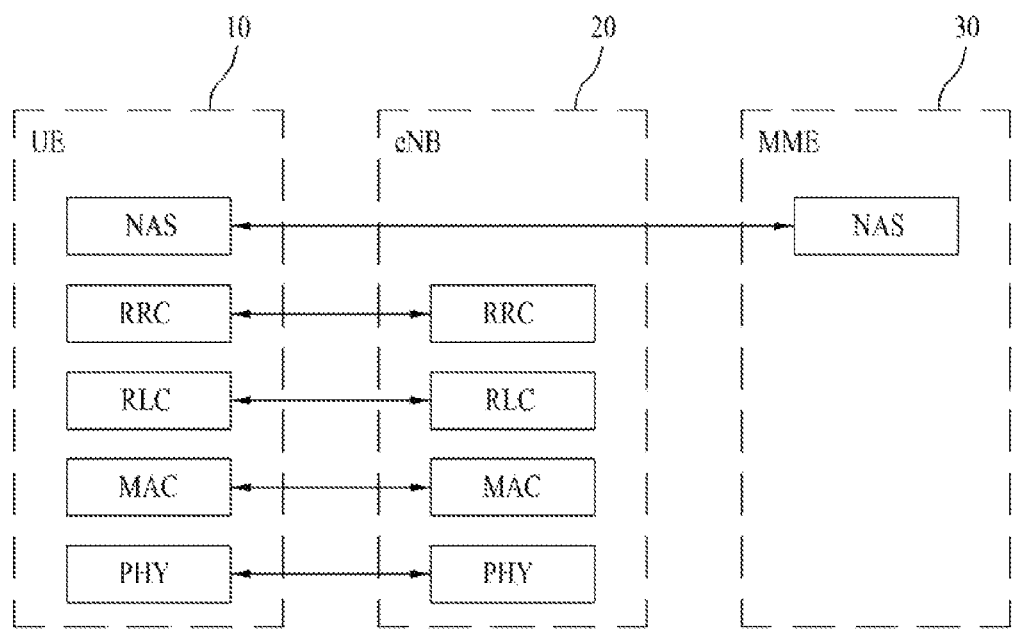

FIGS. 3A and 3B illustrate user-plane and control-plane protocol stacks for E-UMTS. Referring to FIGS. 3A and 3B, the protocol layers may be divided into Layer 1 (L1), Layer 2 (L2), and Layer 3 (L3) based on the lowest three layers of the Open System Interconnection (OSI) reference model known in the field of communication systems.

The Physical (PHY) layer at L1 provides an information transfer service to its higher layer on physical channels. The PHY layer is connected to its higher layer, the Medium Access Control (MAC) layer through transport channels and data is transmitted between the MAC layer and the PHY layer through the transport channels. Data is transmitted between the PHY layers of a transmitter and a receiver on physical channels.

At L2, the MAC layer provides a service to its higher layer, the Radio Link Control (RLC) layer through logical channels. The RLC layer at L2 supports reliable data transmission. When the MAC layer takes charge of the RLC functionalities, the RLC layer is incorporated as a function block into the MAC layer. The Packet Data Convergence Protocol (PDCP) layer at L2 performs a header compression function. Owing to the header compression function, Internet Protocol (IP) packets such as IPv4 or IPv6 packets can be efficiently transmitted via a radio interface having a relatively narrow bandwidth.

The RRC layer at the lowest of L3 is defined only on the control plane. The RRC layer controls logical channels, transport channels, and physical channels in relation to configuration, reconfiguration, and release of RBs. An RB refers to a service provided at L2, for data transmission between the UE 10 and the E-UTRAN.

Referring to FIG. 3A, the RLC layer and the MAC layer are terminated at the eNB 20 and may perform functions such as Automatic Repeat reQuest (ARQ) and Hybrid ARQ (HARQ). The PDCP layer is terminated at the eNB 20 and may perform functions such as header compression, integrity protection, and cyphering.

Referring to FIG. 3B, the RLC layer and the MAC layer are terminated at the eNB 20 and perform the same functions as on the control plane. As in FIG. 3A, the RRC layer is terminated at the eNB 20 and may perform functions such as broadcasting, paging, RRC connection management, RB control, mobility functionality, and UE measurement reporting and control. A NAS control protocol is terminated at the MME of the gateway 30 and may perform functions such as SAE bearer management, authentication, LTE_IDLE mobility handling, paging transmission in LTE_IDLE state, and security control of signaling between the gateway and the UE 10.

Three states are available to the NAS control protocol. LTE_DETACHED state is used in the absence of an RRC entity. LTE_IDLE state is used when minimum UE information is stored and there is no RRC connection. LTE_ACTIVE state is used when an RRC state has been set. The RRC state is divided into RRC_IDLE state and RRC_CONNECTED state.

In the RRC_IDLE state, the UE 10 performs Discontinuous Reception (DRX) configured by the NAS, using a unique ID assigned to the UE in a tracking area. That is, the UE 10 may receive broadcast system information and paging information by monitoring a paging signal in a specific paging opportunity in every UE-specific DRX cycle. In the RRC_IDLE state, no RRC context is stored in the eNB.

In the RRC_CONNECTED state, the UE may transmit and/or receive data to/from the eNB using an E-UTRAN RRC connection and a context of the E-UTRAN. In addition, the UE 10 may report channel quality information and feedback information to the eNB. The E-UTRAN is aware of a cell to which the UE 10 belongs in the RRC_CONNECTED state. Therefore, the network may transmit and/or receive data to/from the UE 10, control mobility such as handover of the UE 10, and perform cell measurement on neighbor cells.

Figure 4:
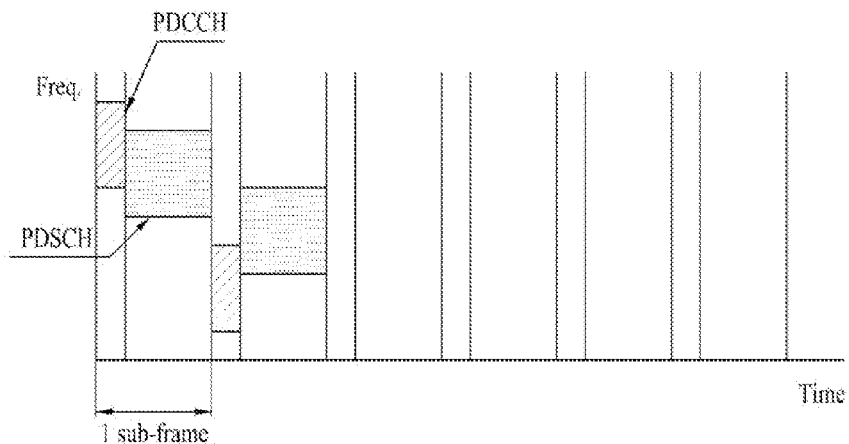
FIG. 4 illustrates a radio frame structure.

FIG. 4 illustrates a radio frame structure.

Referring to FIG. 4, an E-UMTS system uses a 10-ms radio frame. One radio frame includes 10 subframes. Each subframe is further divided into two successive slots, each slot being 0.5 ms in duration. A subframe includes a plurality of symbols (e.g., Orthogonal Frequency Division Multiplexing (OFDM) or SC-FDMA symbols) in time by a plurality of Resource Blocks (RBs) in frequency. One RB has a plurality of symbols by a plurality of subcarriers. On DL, a part (e.g., the first symbol) of a plurality of symbols in a subframe may be used to transmit L1/L2 control information.

Specifically, up to three (or four) OFDM symbols at the start of the first slot of a subframe are allocated as a control region to which a DL control channel is allocated for transmission of L1/L2 control information. The remaining OFDM symbols of the subframe are allocated as a data region to which a Physical Downlink Shared Channel (PDSCH) is allocated. DL control channels include a Physical Control Format Indicator Channel (PCFICH), a Physical Downlink Control Channel (PDCCH), a Physical HARQ Indicator Channel (PHICH), etc. The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal as a response to a UL transmission.

Control information transmitted on a PDCCH is called Downlink Control Information (DCI). DCI formats 0, 3, 3A, and 4 are defined for UL scheduling and DCI formats 1, 1A, 1B, 1C, 1D, 2, 2A, 2B, and 2C are defined for DL scheduling. Depending on its usage, a DCI format selectively includes information such as a hopping flag, an RB assignment, a Modulation Coding Scheme (MCS), a Redundancy Version (RV), a New Data Indicator (NDI), a Transmit Power Control (TPC), a cyclic shift for a DeModulation Reference Signal (DM-RS), a Channel Quality Information (CQI) request, an HARQ process number, a Transmitted Precoding Matrix Indicator (TPMI), Precoding Matrix Indicator (PMI), etc.

The PDCCH delivers information about resource allocation and a transport format for a Downlink Shared Channel (DL-SCH), information about resource allocation and a transport format for an Uplink Shared Channel (UL-SCH), paging information of a Paging Channel (PCH), system information on the DL-SCH, information about resource allocation for a higher-layer control message such as a random access response transmitted on a PDSCH, a set of transmission power control commands for individual UEs of a UE group, a TPC command, Voice Over Internet Protocol (VoIP) activation indication information, etc. A plurality of PDCCHs may be transmitted in the control region. A UE may monitor a plurality of PDCCHs. A PDCCH is transmitted in an aggregate of one or more consecutive Control Channel Elements (CCEs). A CCE is a logical allocation unit used to provide a PDCCH at a coding rate based on the state of a radio channel. A CCE includes a plurality of Resource Element Groups (REGs). The format of a PDCCH and the number of available bits for the PDCCH are determined according to the number of CCEs. An eNB determines a PDCCH format according to DCI to be transmitted to a UE and adds a Cyclic Redundancy Check (CRC) to the control information. The CRC is masked by an ID (e.g., a Radio Network Temporary Identifier (RNTI)) according to the owner or usage of a PDCCH. If the PDCCH is directed to a specific UE, its CRC may be masked by a Cell-RNTI (C-RNTI) of the UE. If the PDCCH is for a paging message, the CRC of the PDCCH may be masked by a Paging Indicator Identifier (P-RNTI). If the PDCCH carries system information (particularly, a System Information Block (SIB)), its CRC may be masked by a System Information RNTI (SI-RNTI). To indicate that the PDCCH carries a Random Access Response, its CRC may be masked by a Random Access-RNTI (RA-RNTI).

Figure 5:
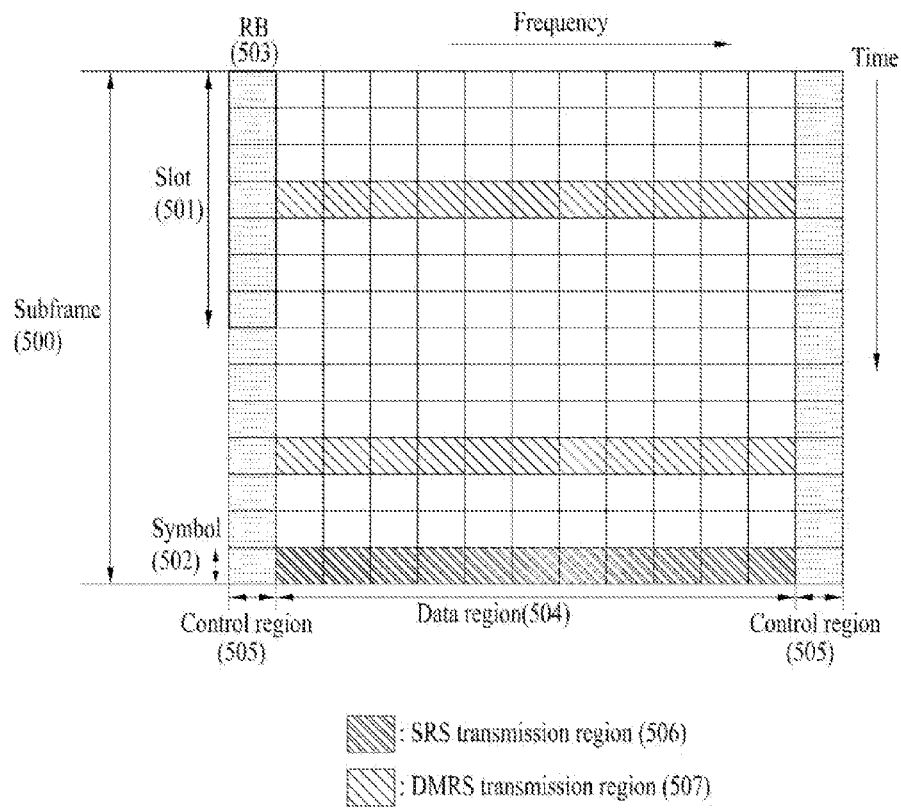
FIG. 5 illustrates a structure of an Uplink (UL) subframe.

FIG. 5 illustrates a structure of a UL subframe.

Referring to FIG. 5, a 1-ms subframe 500 includes two 0.5-ms slots 501. Each slot may include a different number of SC-FDMA symbols according to a Cyclic Prefix (CP) length. For example, a slot includes 7 SC-FDMA symbols in the case of normal CP and 6 SC-FDMA symbols in the case of extended CP. An RB 503 is a resource allocation unit defined as one slot in the time domain by 12 subcarriers in the frequency domain. The UL subframe is divided into a data region 504 and a control region 505. The data region 504 includes a Physical Uplink Shared Channel (PUSCH) and is used to transmit a data signal such as voice. The control region includes a Physical Uplink Control Channel (PUCCH) and is used to transmit Uplink Control Information (UCI). The PUCCH includes an RB pair located at both ends of the data region 504 along the frequency axis and hops over a slot boundary.

The PUCCH may carry the following control information.

Scheduling Request (SR): information used to request UL-SCH resources. The SR is transmitted in On-Off Keying (OOK).

HARQ ACK/NACK (A/N): a response signal to DL data. The HARQ A/N indicates whether the DL data has been received successfully. A 1-bit A/N is transmitted as a response to a single DL codeword and a 2-bit A/N is transmitted as a response to two DL codewords.

Channel State Information (CSI): feedback information (e.g., a Channel Quality Indicator (CQI) for a DL channel. Multiple Input Multiple Output (MIMO)-related feedback information includes an RI, a PMI, and a Precoding Type Indicator (PTI). The CSI occupies 20 bits per subframe. Periodic CSI (p-CSI) is transmitted periodically on a PUCCH according to a period/offset configured by a higher layer, whereas aperiodic CSI (a-CSI) is transmitted aperiodically on a PUSCH according to a command from an eNB.

[Table 1] illustrates a mapping relationship between PUCCH formats and UCI in the LTE/LTE-A system.

TABLE 1

| PUCCH format | Uplink Control Information (UCI) |
|---|---|
| format 1 | SR(Scheduling Request) (non-modulated waveform) |
| format 1a | 1-bit HARQ ACK/NACK (SR present/absent) |
| format 1b | 2-bit HARQ ACK/NACK (SR present/absent) |
| format 2 | CSI (20 coded bits) |
| format 2 | CSI and 1-bit or 2-bit HARQ ACK/NACK (20 bits) (only in the case of extended CP) |
| format 2a | CSI and 1-bit HARQ ACK/NACK (20 + 1 coded bits) |
| format 2b | CSI and 2-bit HARQ ACK/NACK (20 + 2 coded bits) |
| format 3 (LTE-A) | HARQ ACK/NACK + SR (48 bits) |

An A/N and CSI may need to be transmitted in the same subframe. If a higher layer sets simultaneous A/N+CSI transmission as not allowed ("Simultaneous-AN-and-CAI" parameter=OFF), only the A/N is transmitted in PUCCH format 1a/1b, while the CSI transmission is dropped. On the other hand, if the higher layer sets simultaneous A/N+CSI transmission as allowed ("Simultaneous-AN-and-CAI" parameter=ON), both the A/N and the CQI are transmitted in PUCCH format 2/2a/2b. Specifically, in the case of normal CP, the A/N is embedded in the second RS of each slot (e.g., the A/N is multiplied by the RS) in PUCCH format 2a/2b. In the case of extended CP, the A/N and the CQI are encoded jointly and transmitted in PUCCH format 2.

Figure 6:
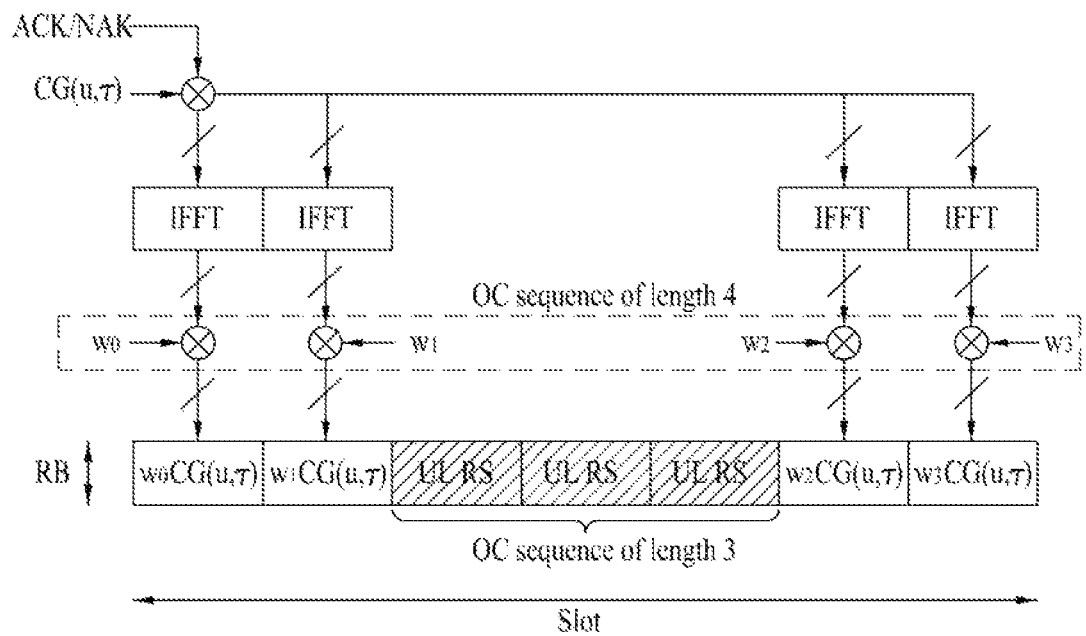
FIG. 6 illustrates a slot-level structure of Physical Uplink Control Channel (PUCCH) format 1a/1b.

FIG. 6 illustrates a slot-level structure of PUCCH format 1a;1b. PUCCH format 1 used for SR transmission is identical to PUCCH format 1a/1b in structure.

Referring to FIG. 6, 1-bit A/N information [b(0)] and 2-bit A/N information [b(0)b(1)] are modulated respectively in Binary Phase Shift Keying (BPSK) and Quadrature Phase Shift Keying (QPSK) to one A/N modulation symbol d0. Each bit [b(i), i=0,1] of the A/N information indicates an HARQ response for a corresponding Transport Block (TB). If the bit is 1, it indicates a positive ACK and if the bit is 0, it indicates a NACK. [Table 4] is a modulation table for PUCCH formats 1a and 1b in the legacy LTE system.

TABLE 2

| PUCCH format | b(0), . . . , b($M_{bit}$ − 1) | d(0) |
|---|---|---|
| 1a | 0 | 1 |
|  | 1 | −1 |
| 1b | 00 | 1 |
|  | 01 | −j |
|  | 10 | j |
|  | 11 | −1 |

PUCCH format 1a/1b is cyclically shifted ($\alpha_{cs,x}$) in the frequency domain and spread with an orthogonal code (e.g., a Walsh-Hadamard or a Discrete Fourier Transform (DFT) code) $w_0$, $w_1$, $w_2$, and $w_3$ in the time domain.

Figure 7:
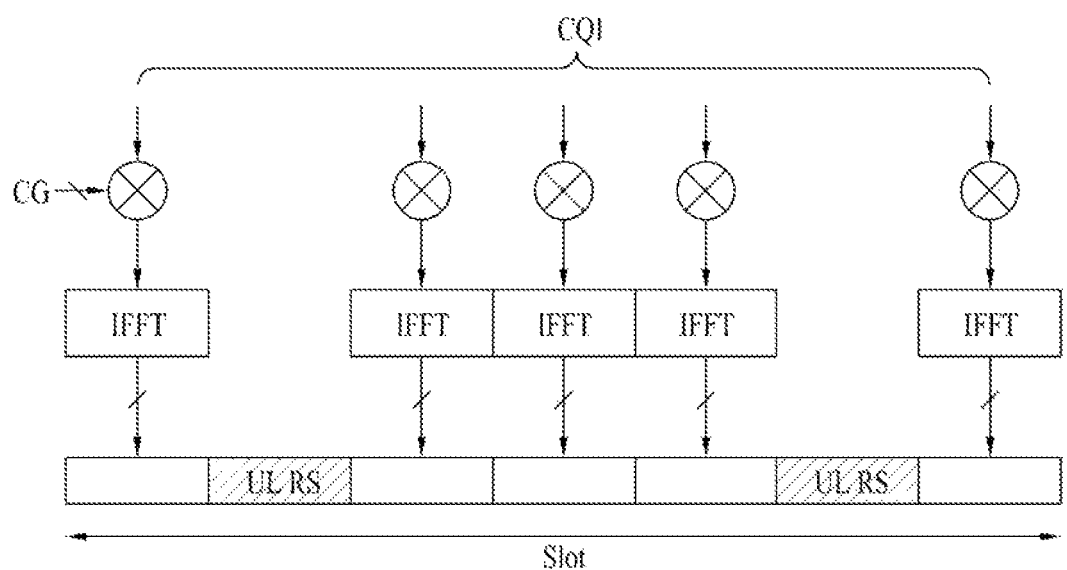
FIG. 7 illustrates a slot-level structure of PUCCH format 1/2a/2b.

FIG. 7 illustrates PUCCH format 2/2a/2b.

Referring to FIG. 7, if a normal CP is configured, PUCCH format 2/2a/2b includes five QPSK data symbols and two Reference Signal (RS) symbols at a slot level. If an extended CP is configured, an RS symbol is located in the fourth SC-FDMA symbol of each slot. Therefore, PUCCH format 2/2a/2b may carry 10 QPSK data symbols in total. Each QPSK symbol is spread with a Cyclic Shift (CS) in the frequency domain and mapped to a corresponding SC-FDMA symbol. RSs may be multiplexed in Code Division Multiplexing (CDM) using a CS.

Figure 8:
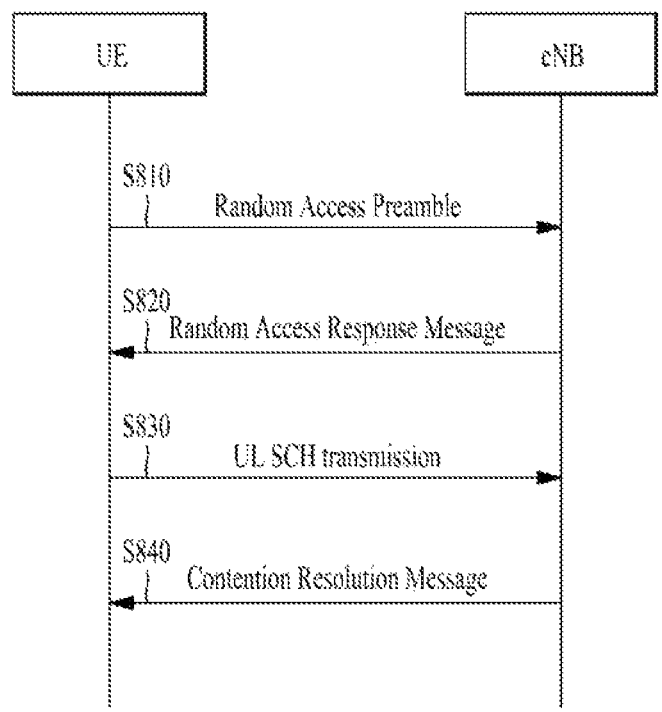
FIG. 8 is a diagram illustrating a signal flow for a random access procedure.

FIG. 8 illustrates a random access procedure.

Referring to FIG. 8, a UE receives random access information from an eNB by system information. Subsequently, when random access is needed, the UE transmits a Random Access Preamble (message 1) to the eNB (S810). Upon receipt of the Random Access Preamble from the UE, the eNB transmits a Random Access Response (RAR) message (message 2) to the UE (S820). Specifically, DL scheduling information for the RAR message is CRC-masked by an RA-RNTI and transmitted on an L1/L2 control channel (PDCCH). The PDCCH masked by the RA-RNTI (hereinafter, referred to as RAR-PDCCH) is transmitted in a common search space. Upon receipt of the DL scheduling signal masked by the RA-RNTI, the UE may receive the RAR message on a scheduled PDSCH and decode the RAR message. Then, the UE determines whether RAR information directed to the UE is included in the RAR message. The UE may determine whether the RAR information directed to the UE is included by checking the presence or absence of a Random Access preamble ID (RAID) for the preamble transmitted by the UE. The RAR information includes a Timing Advance (TA), UL resource allocation information, a temporary UE ID identifying the UE (e.g., a Temporary C-RNTI or TC-RNTI), etc. Upon receipt of the RAR response information, the UE transmits a UL message (message 3) to the eNB on a UL-SCH according to the radio resource allocation information included in the RAR information (S830). After receiving the UL message, the eNB transmits a contention resolution message (message 4) to the UE (S840).

Figure 9:
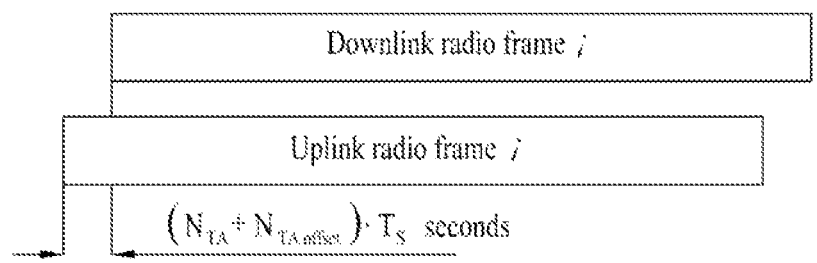
FIG. 9 illustrates an exemplary Uplink-Downlink (UL-DL) timing relationship.

FIG. 9 illustrates an exemplary UL-DL timing relationship.

Referring to FIG. 9, a UE may start to transmit UL radio frame #i $(N_{TA}+N_{TAoffset}) \times T_s$ before the starting point of a DL radio frame linked to UL radio frame #i. Here, $0 \le N_{TA} \le 20512$. $N_{TAoffsetb}=0$ in Frequency Division Duplex (FDD) and $N_{TAoffset}=624$ in Time Division Duplex (TDD). $N_{TA}$ is indicated by a TA Command (TAC) and the UE adjusts the transmission timing of a UL signal (e.g., a PUCCH, a PUSCH, a Sounding Reference Signal (SRS), etc.) by $(N_{TA}+N_{TAoffset}) \times T_s$. The UL transmission timing may be adjusted in units of 16 $T_S$. $T_S$ is a sampling time. A TAC set in an RAR message is 11 bits, indicating a value ranging from 0 to 1282 and $N_{TA}=TA \times 16$. Otherwise, a TAC is 6 bits, indicating a value ranging from 0 to 63 and $N_{TA}=N_{TA,old}+(TA-31) \times 16$. A TAC received in subframe #n is applied after subframe #n+6.

FIG. 10 illustrates an exemplary handover procedure.

Referring to FIG. 10, a UE 10 transmits a measurement report to a source eNB 20 (S102). The source eNB 20 transmits a handover request message along with a context of the UE 10 to a target eNB 30 (S104). The target eNB 30 transmits a handover request response message to the source eNB 20 (106). The handover request response message includes information such as a part of a handover command message and a dedicated preamble index for contention-free random access to a target cell. The source eNB 20 transmits a handover command to the UE 10 (S108). The handover command includes random access information such as a new C-RNTI and a dedicated preamble index to be used by the UE 10. The UE 10 performs a random access procedure in the target cell after the handover command in order to acquire a TA value. The random access procedure is a contention-free random access procedure in which a preamble index is reserved for the UE 10 to avoid collision. The UE 10 starts the random access procedure with the target eNB 30 by transmitting a Random Access Preamble using the dedicated preamble index (S110). The target eNB 30 transmits an RAR message to the UE 10 (S112). The RAR message includes a TA and a UL resource assignment. The UE 10 transmits a handover complete message to the target eNB 30 (S114).

FIG. 11 illustrates an example of determining PUCCH resources for A/N transmission. In the LTE/LTE-A system, PUCCH resources for an A/N are not pre-allocated to each UE. Rather, a plurality of PUCCH resources are divided for a plurality of UEs at each time point. Specifically, PUCCH resources in which a UE transmits an A/N are linked to a PDCCH carrying scheduling information for DL data or a PDCCH indicating Semi-Persistent Scheduling (SPS) release. A PDCCH transmitted to a UE in a DL subframe includes a plurality of CCEs. The UE may transmit an A/N in PUCCH resources linked to a specific CCE (e.g., the first CCE) among the CCEs of the received PDCCH. For example, if a PDCCH including CCEs #4, #5, and #6 delivers information about a PDSCH as illustrated in FIG. 11, the UE transmits an A/N on PUCCH #4 corresponding to the first CCE of the PDCCH, CCE #4.

Specifically, PUCCH resource indexes are determined in the LTE/LTE-A system, by the following equation.

$$n^{(1)}_{PUCCH} = n_{CCE} + N^{(1)}_{PUCCH} \quad \text{[Equation 1]}$$

In [Equation 1], $n^{(1)}_{PUCCH}$ represents a resource index of PUCCH format 1a/1b for ACK/NACK/DTX transmission, $N^{(1)}_{PUCCH}$ IS a value indicated by higher-layer signaling, and $n_{cCE}$ represents the smallest of CCE indexes used for PDCCH transmission. A CS, an Orthogonal Code (OC), and a Physical Resource Block (PRB) for PUCCH format 1a/1b are obtained from $n^{(1)}_{PUCCH}$.

Because an LTE UE cannot transmit a PUCCH and a PUSCH at the same time, the LTE UE multiplexes UCI in a PUSCH region (PUSCH piggyback) when the LTE UE needs to transmit UCI (e.g., a CQ/PMI, an HARQ-ACK, an RI, etc.) in a subframe carrying the PUSCH. An LTE-A UE may also be configured not to transmit a PUCCH and a PUSCH at the same time. In this case, if the LTE-A UE needs to transmit UCI (e.g., a CQ/PMI, an HARQ-ACK, an RI, etc.) in a subframe carrying the PUSCH, the LTE-A UE mat multiplex UCI in a PUSCH region (PUSCH piggyback).

Figure 12:
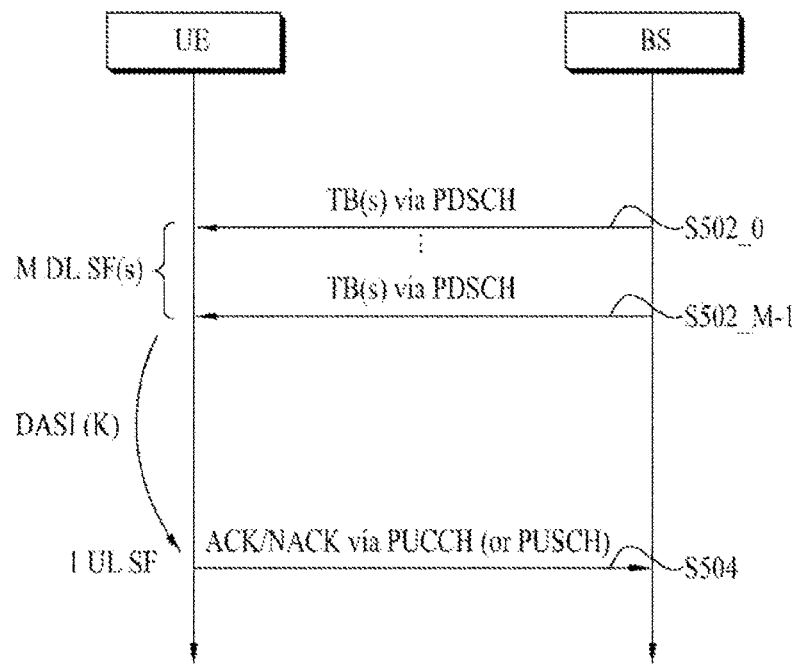
FIG. 12 is a diagram illustrating a signal flow for an ACK/NACK transmission procedure in a single-cell situation.

FIG. 12 illustrates a UL A/N transmission procedure in a single-cell situation.

Referring to FIG. 12, a UE may receive one or more DL transmissions (e.g., PDSCH signals) in M DL Subframes (SFs) (S502_0 to S502_M–1). Each PDSCH signal carries one or more (e.g., 2) TBs (or CodeWords (CWs)) according to a Transmission Mode (TM). While not shown, a PDCCH signal requiring an ACK/NACK response, for example, a PDCCH signal indicating SPS release (shortly, referred to as an SPS release PDCCH signal) may also be received in steps S502_0 to S502_M–1. In the presence of a PDSCH signal and/or an SPS release PDCCH signal in the M DL SFs, the UE transmits an A/N in one UL SF corresponding to the M DL SFs after an operation for A/N transmission (e.g., A/N (payload) generation, A/N resource allocation, etc.) (S504). The A/N includes response information to the PDSCH signals and/or the SPS release PDCCH signal received in steps S502_0 to S502_M–1. Although an A/N is transmitted basically on a PUCCH (e.g., see FIGS. 6 and 7), if a PUSCH is to be transmitted at a transmission time of the A/N, the A/N may be transmitted on the PUSCH. Various PUCCH formats listed in [Table 1] are available for A/N transmission. To reduce the number of A/N bits transmitted in a PUCCH format, various methods such as A/N bundling, A/N channel selection, etc. may be used.

M is 1 in FDD, whereas M is an integer equal to or larger than 1 in TDD. An A/N is transmitted in one UL SF in response to data received in M DL SFs in TDD. This UL-DL relationship is given by a Downlink Association Set Index (DASI).

[Table 3] lists DASIs (K:: $\{k_0, k_1, \ldots k_{M-1}\}$) defined in the LTE/LTE-A system. If a PDSCH and/or a SPS release PDCCH is transmitted in SF (n-k) (k∈K), a UE transmits a related ACK/NACK in SF n.

TABLE 3

| UL-DL Configuration | 0 | 1 | 2 | 3 | 4 | 5 | 6 | 7 | 8 | 9 |
|---|---|---|---|---|---|---|---|---|---|---|
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In TDD, the UE should transmit an A/N signal in one UL SF in response to reception of one or more DL transmissions (e.g., PDSCHs) in M DL SFs. An A/N is transmitted in one UL SF in response to a plurality of DL SFs in the following manners.

1) A/N bundling: A/N bits for a plurality of data units (e.g., PDSCHs, SPS release PDCCHs, etc.) are combined by a logic operation (e.g., logic-AND operation). For example, if all of the data units are decoded successfully, a receiver (e.g., a UE) transmits an ACK signal. On the other hand, if decoding (or detection) of at least one of the data units is failed, the receiver transmits a NACK signal or no signal.

2) Channel selection: upon receipt of a plurality of data units (e.g., PDSCHs, SPS release PDCCHs, etc.), a UE occupies a plurality of PUCCH resources for A/N transmission. An A/N response to the plurality of data units is identified by a combination of PUCCH resources used for actual A/N transmission and A/N contents (e.g., bit values or QPSK symbol values). The channel selection scheme is also called an A/N selection scheme or a PUCCH selection scheme.

Figure 13:
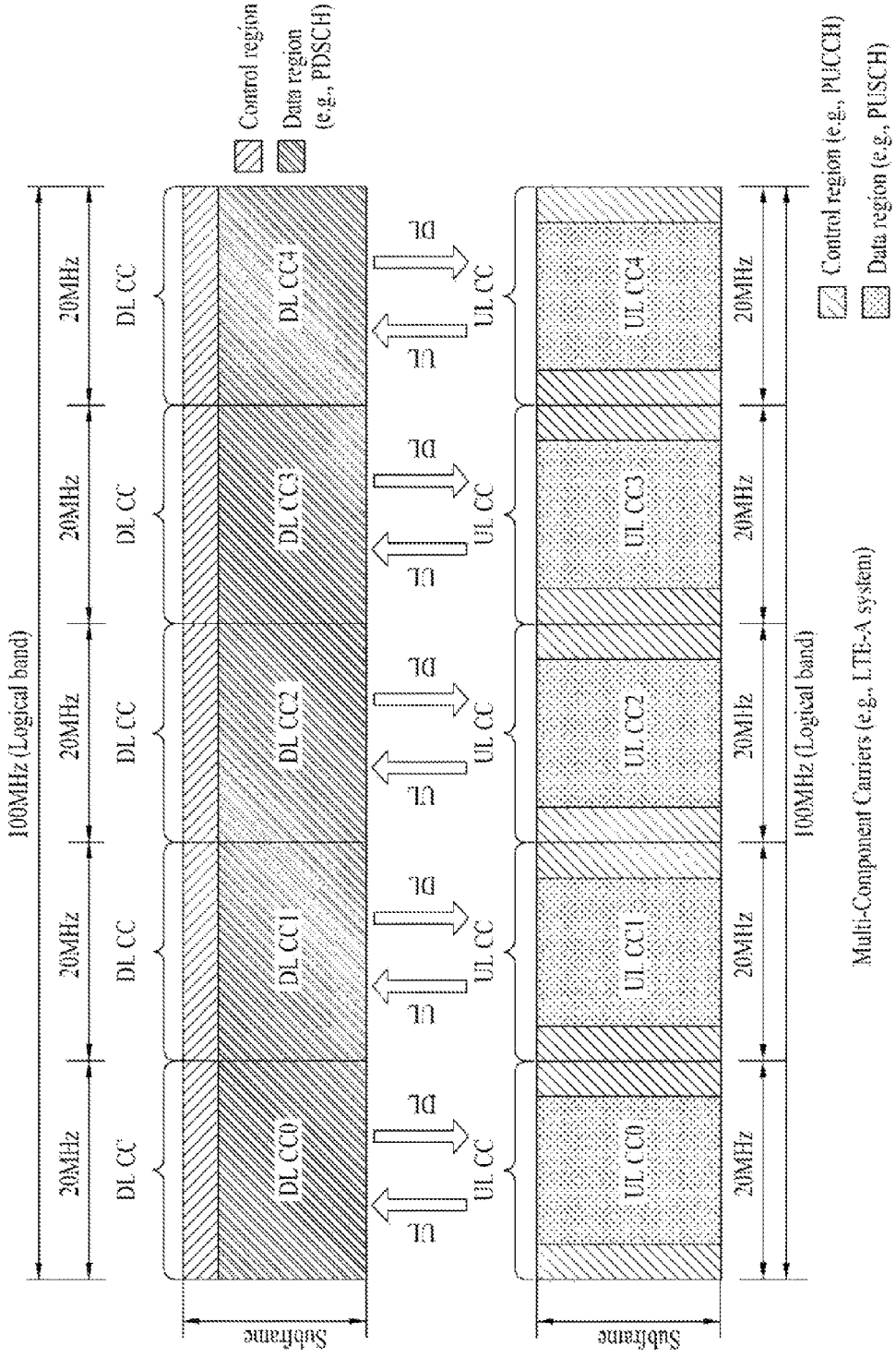
FIG. 13 illustrates an exemplary Carrier Aggregation (CA) communication system.

FIG. 13 illustrates an exemplary Carrier Aggregation (CA) system. An LTE-A system uses CA or bandwidth aggregation by aggregating a plurality of UL/DL frequency blocks to a broader frequency band. Each frequency block is transmitted in a Component Carrier (CC). The CC may be understood as a carrier frequency (center carrier or center frequency) for the frequency block.

Referring to FIG. 13, a broader UL/DL bandwidth may be supported by aggregating a plurality of UL/DL CCs. The CCs may be contiguous or non-contiguous in the frequency domain. The bandwidth of each CC may be determined independently. Asymmetric CA is available, in which the number of UL CCs is different from that of DL CCs. For example, if there are two DL CCs and one UL CC, the DL CCs and the UL CC may be configured 2:1. A DL CC/UL CC link may be configured statically or semi-statically in a system. Even though a total system band includes N CCs, a frequency band that a specific UE may monitor/receiver may be limited to L (<N) CCs. Various parameters for CA may be configured cell-specifically, UE group-specifically, or UE-specifically. Control information may be configured to be transmitted and received only in a specific CC. This specific CC may be referred to as a Primary CC (PCC, or anchor CC) and the other CCs may be referred to as Secondary CCs (SCCs).

The LTE-A system adopts the concept of cell to manage radio resources. A cell is defined as a combination of DL resources and UL resources, although the UL resources are not mandatory. Accordingly, a cell may be configured with DL resources alone or both DL and UL resources. If CA is supported, linkage between the carrier frequency of DL resources (or DL CCs) and the carrier frequency of UL resources (or UL CCs) may be indicated by system information. A cell operating in a primary frequency (or PCC) may be referred to as a Primary Cell (PCell) and a cell operating in secondary frequency (or SCC) may be referred to as a Secondary Cell (SCell). The PCell is used for a UE to perform an initial connection establishment procedure or a connection reconfiguration procedure. The PCell may be a cell indicated during a handover procedure. The SCell may be configured after an RRC connection is established and used to additional radio resources. The PCell and the SCell may be collectively called serving cells. Accordingly, For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells. For CA, the network may configure one or more SCells for a UE supporting CA in addition to a PCell configured initially during a connection establishment procedure, after an initial security activation procedure starts.

If cross-carrier scheduling (or cross-CC scheduling) is used, a PDCCH for DL allocation may be transmitted in DL CC #0 and a PDSCH corresponding to the PDCCH may be transmitted in DL CC #2. For cross-CC scheduling, the introduction of a Carrier Indicator Field (CIF) may be considered. The presence or absence of a CIF in a PDCCH may be configured semi-statically or UE-specifically (or UE group-specifically) by higher layer signaling (e.g., RRC signaling). The baseline of PDCCH transmission is summarized as follows.

CIF disabled: A PDCCH in a DL CC allocates PDSCH resources of the same DL CC or PUSCH resources of one UL CC linked to the DL CC.

CIF enabled: A PDCCH in a DL CC may allocate PDSCH or PUSCH resources of a specific DL/UL CC from among a plurality of aggregated DL/UL CCs, using a CIF.

In the presence of a CIF, an eNB may allocate a DL CC set for PDCCH monitoring in order to reduce Blind Decoding (BD) complexity of a UE. The PDCCH monitoring DL CC set is a part of total DL CCs, including one or more DL CCs and the UE detects/decodes a PDCCH only in the DL CCs. In other words, when the eNB schedules a PDSCH/PUSCH for the UE, the PDCCH transmits a PDCCH only in the PDCCH monitoring DL CC set. The PDCCH monitoring DL CC set may be configured UE-specifically, UE group-specifically, or cell-specifically. The term "PDCCH monitoring DL CC" may be replaced with an equivalent term such as monitoring carrier, monitoring cell, etc. Further, aggregated CCs for a UE may be interchangeably used with serving CCs, serving carriers, serving cells, etc.

Figure 14:
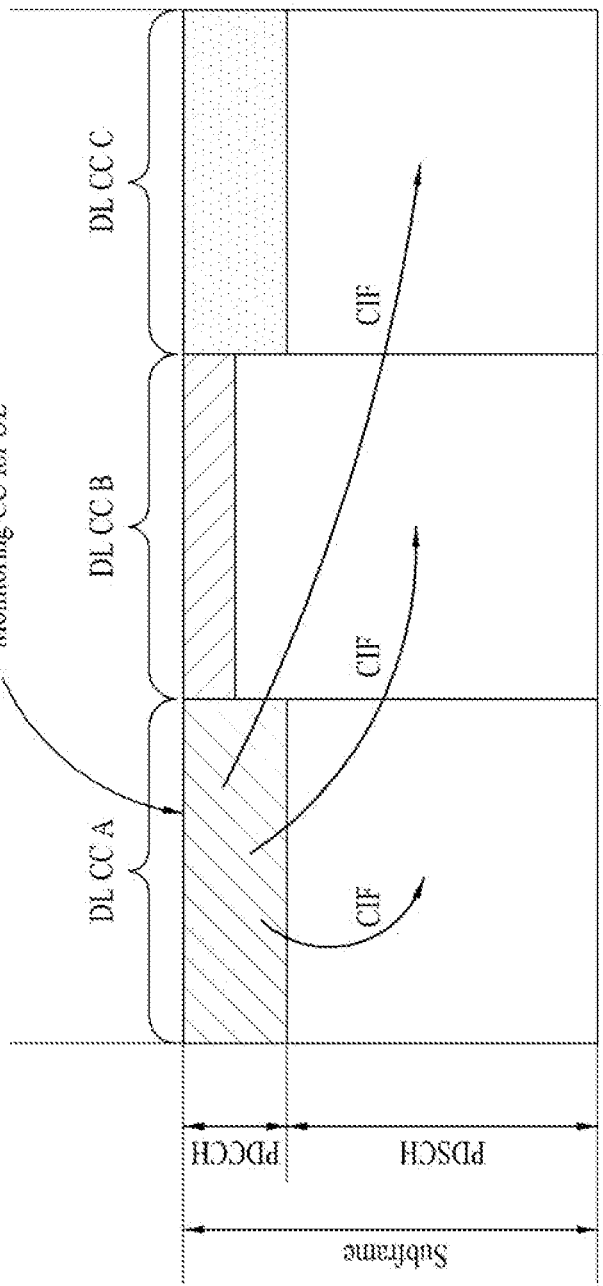
FIG. 14 illustrates an exemplary scheduling in the case where a plurality of carriers are aggregated.

FIG. 14 illustrates an exemplary scheduling in the case where a plurality of carriers are aggregated. In the example of FIG. 14, three DL CCs are aggregated and DL CC A is configured as a PDCCH monitoring DL CC. DL CC A, DL CC B, and DL CC C may be referred to as serving CCs, serving carriers, serving cells, etc. If a CIF is disabled, each DL CC may carry a PDCCH that schedules its PDSCH without a CIF according to an LTE PDCCH rule. On the contrary, if the CIF is enabled, DL CC A (monitoring DL CC) may carry a PDCCH that schedules a PDSCH of another CC as well as a PDCCH that schedules a PDSCH of DL CC A, using the CIF. In this case, DL CC B and DL CC C that have not been configured as monitoring DL CCs do not carry a PDCCH.

Figure 15:
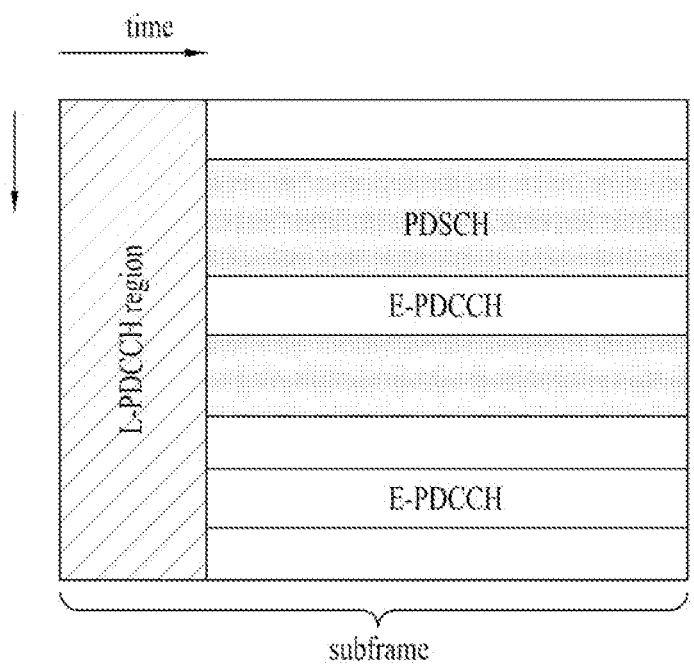
FIG. 15 illustrates an example of allocating a Physical Downlink Control Channels (PDCCH) to a data region of a subframe.

FIG. 15 illustrates an example of allocating DL physical channels to a subframe.

Referring to FIG. 15, a legacy LTE/LTE-A PDCCH (for the convenience, referred to as a legacy PDCCH or an L-PDCCH) may be allocated to the control region of a subframe (refer to FIG. 4). In FIG. 15, an L-PDCCH region is a region available for allocation of a legacy PDCCH. A PDCCH may be additionally allocated to the data region of the subframe (e.g., a resource region for a PDSCH). The PDCCH allocated to the data region is referred to as an Enhanced PDCCH (E-PDCCH). As illustrated in FIG. 15, scheduling limitations imposed by limited control channel region of the L-PDCCH region may be mitigated by securing additional control channel resources through the E-PDCCH. Like the L-PDCCH, the E-PDCCH delivers DCI. For example, the E_PDCCH may carry DL scheduling information and UL scheduling information. For example, a UE may receive an E-PDCCH and receive data/control information on a PDSCH corresponding to the E-PDCCH. Further, the UE may receive an E-PDCCH and transmit data/control information on a PUSCH corresponding to the E-PDCCH. An E-PDCCH/PDSCH may start from the first OFDM symbol of a subframe depending on a cell type.

Figure 16:
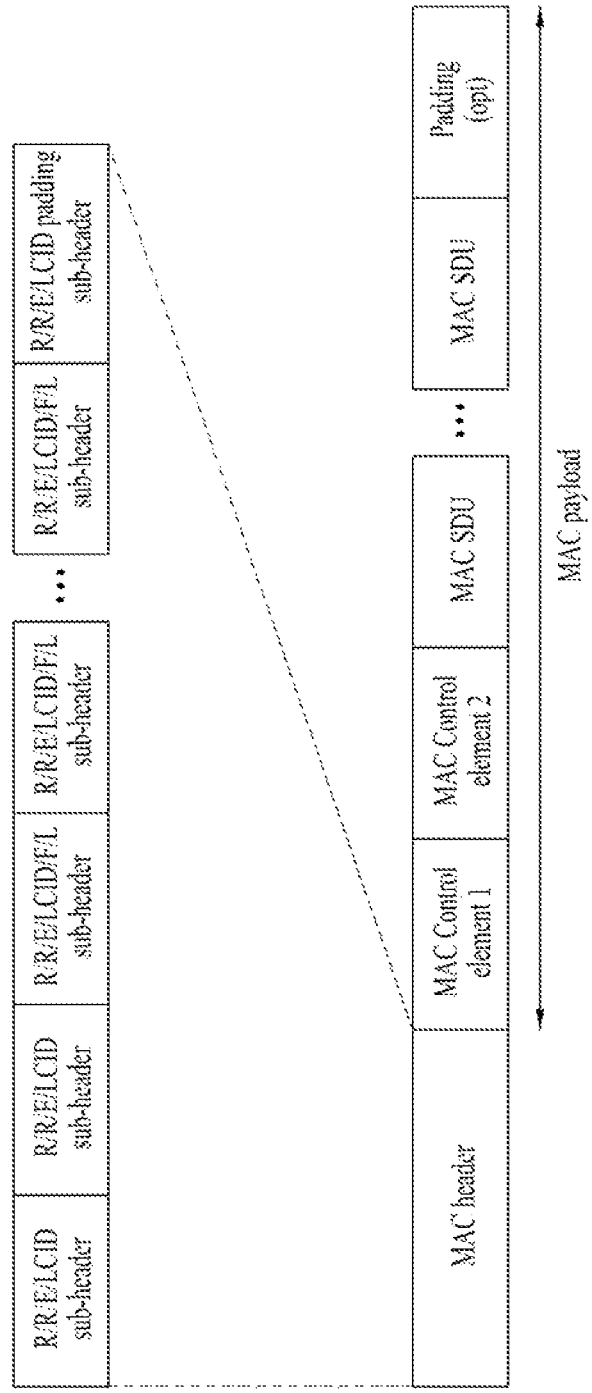
FIG. 16 illustrates a Medium Access Control (MAC) Packet Data Unit (PDU)

FIG. 16 illustrates a MAC PDU. MAC PDUs are transmitted on a DL-SCH and a UL-SCH.

Referring to FIG. 16, the MAC PDU includes a MAC header, zero or more MAC Service Data Units (SDUs), and zero or more MAC Control Elements (CEs). MAC PDU subheaders are arranged in the same order as their corresponding MAC SDUs and MAC CEs. A MAC CE is located before a MAC SDU. The MAC CE carriers various types of MAC control information. For example, the MAC CE includes SCell activation/deactivation information, TAC information, Buffer Status Report (BSR) information, and Power Headroom Report (PHR) information.

Figure 17:
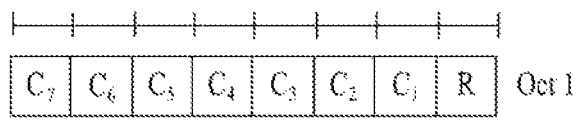
FIG. 17 illustrates a Secondary Cell (SCell) activation/deactivation MAC Control Element (CE)

FIG. 17 illustrates a SCell activation/deactivation MAC CE. An eNB may activate or deactivate total individual SCells aggregated for a UE using a SCell activation/deactivation MAC CE. On the contrary, a PCell is always activated.

Referring to FIG. 17, the activation/deactivation MAC CE is identified by a MAC PDU having a Logical Channel Identifier (LCID) indicating activation/deactivation (e.g., LCID=11011). The activation/deactivation MAC CE is one octet, including seven C-fields and one R-field.

$C_i$: indicates an active/inactive state of a SCell having SCellIndex i. In the absence of a SCell having SCellIndex I, a UE ignores the $C_i$ field. If the $C_i$ field indicates activation, it is set to 1 and if $C_i$ field indicates deactivation, it is set to 0.

R: a reserved bit. It is set to 0.

Figure 18:
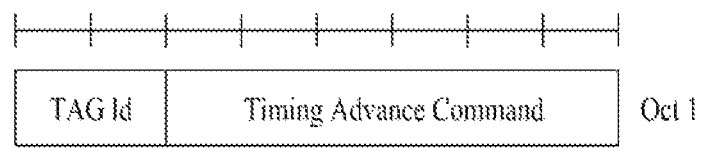
FIG. 18 illustrates a Timing Advance Command (TAC) MAC CE.

FIG. 18 illustrates a TAC MAC CE. An eNB may adjust a UL timing on a Timing Advance Group (TAG) basis for all TAGs configured for a UE using a TAC MAC CE. The TAC MAC CE includes a TAG Identity (TAG ID) field and a TAC field.

TAG: indicates a TAG. If the TAG includes a PCell, the TAG ID=0.

TAC: indicates a timing adjustment amount to be applied to a UE. The TAC is 6 bits indicating a value ranging from 0 to 63. For details, refer to FIG. 9.

Figure 19:
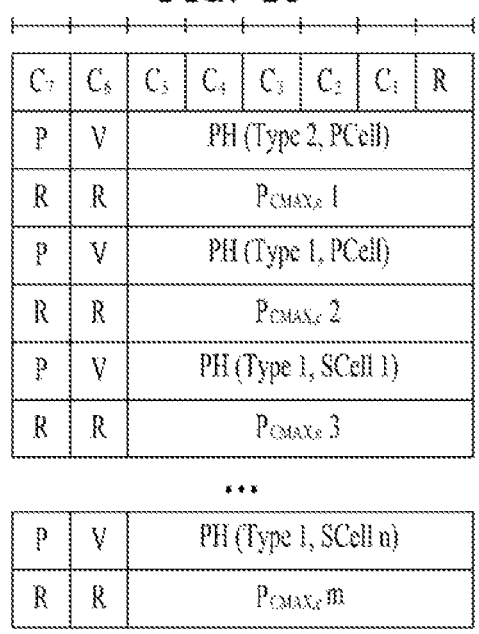
FIG. 19 illustrates a Power Headroom Report (PHR) MAC CE.

FIG. 19 illustrates a Power Headroom (PH) MAC CE, particularly, an extended PH MAC CE. The PH MAC CE may indicate a PH for all aggregated cells to a UE. The PH MAC CE includes the following fields.

$C_i$: indicates whether a PH field exists for a SCell having SCellIndex i. If a PH field for a SCell having SCellIndex i is reported, the $C_i$ field is set to 1 and otherwise, the $C_i$ field is set to 0.

R: a reserved bit. It is set to 0.

V: indicates whether a PH value is based on actual transmission or a reference format.

PH: indicates a PH level.

P: indicates whether a backoff is applied for power management of a UE.

$P_{CMAX,c}$: provides information about maximum power per cell, used to calculate the value of a previously positioned PH field.

Embodiments: Signaling in Inter-Site CA

The LTE-A system supports aggregation of a plurality of cells (i.e., CA) and considers management of all of a plurality of cells aggregated for one UE by one eNB (intra-site CA). In intra-site CA, since one eNB manages all cells, signaling related to RRC configurations/reports and MAC commands/messages may be performed in any of the cells. For example, signaling related to an operation for adding or releasing a specific SCell to or from a CA cell set, an operation for changing a Transmission Mode (TA) of a specific cell, an operation for performing Radio Resource Management (RRM) measurement reporting related to a specific cell, etc. may be performed in any cell of a CA cell set. In another example, signaling related to an operation for activating/deactivating a specific SCell, an operation for transmitting a Buffer Status Report (BSR) for UL buffer management, etc. may be performed in any cell of a CA cell set. In a further example, a per-cell Power Headroom Report (PHR) for UL power control, a per-TAG TAC for UL synchronization control, etc. may be signaled in any cell of a CA cell set.

In future systems after LTE-A, a plurality of cells having small coverage (e.g., micro cells) may be deployed within a cell having larger coverage (e.g., a macro cell), for traffic optimization. For example, a macro cell and a micro cell may be aggregated for one UE. The macro cell may be used mainly for mobility management (e.g., PCell) and the micro cell may be used mainly for boosting throughput (e.g., SCell). In this case, the cells aggregated for the UE may have different coverage and may be managed by different eNBs (or nodes corresponding to the eNBs (e.g., relays)) geographically apart from each other (inter-site CA).

Figure 20:
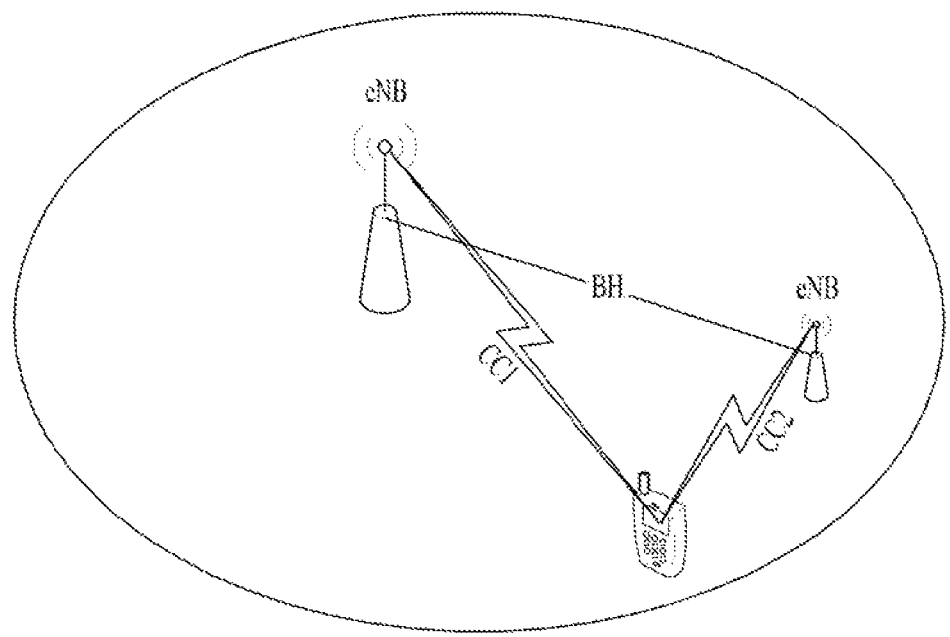
FIG. 20 illustrates exemplary inter-site CA.

FIG. 20 illustrates an exemplary inter-site CA. Referring to FIG. 20, an eNB managing a PCell (e.g., CC1) may be responsible for controlling and managing radio resources (e.g., all RRC functions and partial MAC functions) for a UE and each eNB managing a cell (i.e., CC1 or CC2) may be responsible for data scheduling and feedback (e.g., all PHY functions and main MAC functions) for the cell. Accordingly, information/data needs to be exchanged/transmitted between cells (i.e., eNBs). In consideration of legacy signaling, information/data may be exchanged/transmitted between cells (i.e., eNBs) through a backhaul (BH) (e.g., via a wired X2 interface or a radio backhaul link) in inter-site CA. However, if the legacy signaling is still used, cell management stability, resource control efficiency, data transmission adaptability, etc. may be significantly reduced due to latency involved in signaling between eNBs.

For example, an inter-site CA situation may be assumed, in which a PCell (e.g., CC1) and a SCell (e.g., CC2) aggregated for one UE are managed by eNB-1 and eNB-2 respectively, as illustrated in FIG. 20. It is also assumed that the eNB managing the PCell (i.e., eNB-1) manages/controls RRC functions related to the UE. If an RRM measurement (e.g., Reference Signal Received Power (RSRP) or Reference Signal Received Quality (RSRQ)) report related to the SCell is transmitted in the SCell (e.g., via a PUSCH), not the PCell, eNB-2 may have to transmit the RRM measurement report to eNB-1 through the BH. If eNB-1, for example, transmits an RRC reconfiguration command requesting release of the SCell from a CA cell set to the UE in the PCell (e.g., via a PDSCH), the UE may transmit a confirmation response for the RRC reconfiguration command in the SCell (e.g., via a PUSCH), not the PCell. In this case, eNB-2 may have to transmit the confirmation response to eNB-1 through the BH. Thus, the inter-site CA may cause a great latency during signaling between the cells (i.e., the eNBs). As a result, a mismatch in CA cell set interpretation may occur between an eNB and a UE and stable/efficient management and control of cell resources may not be facilitated.

In another example, per-cell PHRs of all cells may be transmitted in the PCell (e.g., via a PUSCH) in the above inter-site CA situation. In this case, eNB-1 (managing the PCell) may have to transmit all PHRs or a PHR corresponding to the SCell to eNB-2 (managing the SCell) through the BH. On the contrary, if the per-cell PHRs of all cells are transmitted in the SCell, eNB-2 may have to transmit all PHRs or a PHR corresponding to the PCell to eNB-1 through the BH. As described before, stable/efficient UL power control and adaptive UL data scheduling/transmission based on the UL power control may not be easy due to latency involved in signaling between the eNBs.

To avert the above problem, it is proposed that a path for specific signaling (e.g., RRC, MAC, DCI, and UCI) related to a specific cell (e.g., a cell or cell group that may perform a transmission/reception operation regarding signaling) is configured in an inter-site CA situation or its similar situation. For example, a path (e.g., a cell or cell group) for performing a signal/channel transmission and/or reception operation accompanying specific signaling related to a specific cell may be configured. In this case, a UE may operate, considering that a signal/channel accompanying the specific signaling related to the specific cell may be transmitted and/or received only in the configured path. For example, reception/detection/monitoring and/or transmission/encoding of the signal/channel accompanying the specific signaling related to the specific cell may be performed only in the configured path, not in any other path. According to the present invention, a specific cell covers a cell or a cell group. For this purpose, a plurality of aggregated cells may be divided into one or more cell groups. Each cell group includes one or more cells. For the convenience, a cell group including a PCell is referred to as a PCell group and a cell group including only SCells is referred to as a SCell group. There may be one PCell group and zero or more SCell groups. Unless otherwise mentioned herein, a PDCCH may cover both an L-PDCCH and an E-PDCCH.

A signaling method/path proposed by the present invention may be performed only in inter-site CA or a similar CA situation. In other words, not the signaling method/path proposed by the present invention but a conventional signaling method/path may be applied to an intra-CA situation. A CA mode (i.e., inter-site CA or intra-site CA) may be considered to configure a signaling method/path on the part of an eNB, whereas knowledge of a used signaling method/path is sufficient on the part of a UE. Therefore, the eNB may transmit only indication information indicating the applied signaling method/path to the UE, without indicating a CA mode. If the UE can determine the CA mode during CA configuration, the UE may determine the signaling method/path applied to the UE based on the CA mode. Accordingly, the eNB may not transmit the indication information indicating the signaling method/path to the UE.

Signaling for which a path needs to be configured may include the followings according to the present invention.
 command/response transmitted during RRC configuration/reconfiguration (e.g., SCell allocation/deallocation, per-cell TM configuration, and per-cell CSI feedback mode/SRS parameter configuration)
 Radio Link Monitoring (RLM) (e.g., Radio Link Failure (RLF)) and RRM measurement (e.g., RSRP or RSRQ)-related configuration/report
 Handover (HO)-related command/response
 SCell MAC activation/deactivation (i.e. SCell Act/De) message
 PHR, BSR, and TAC
 DCI (e.g., DL/UL grant) and Scheduling Request (SR)
 Periodic CSI (p-CSI) report and aperiodic CSI (a-CSI) request/report
 ACK/NACK (A/N) feedback in response to DL data reception
 Random Access Response (RAR) and PDCCH that schedules a PDSCH carrying the RAR (hereinafter, referred to as RAR PDCCH)

For example, a path for signaling involved in an RRC reconfiguration operation for additionally allocating/deallocation a specific cell to/from a CA cell set and an RRM measurement (e.g., RSRP or RSRQ) report related to the specific cell may be configured as a PCell group. In this case, the signaling involved in the RRC reconfiguration/measurement report related to the specific cell may be transmitted/received only through the PCell group (a PDSCH/PUSCH in any cell belonging to the PCell group). Further, a path in which a per-cell PHR may be signaled for UL power control of a specific cell group (or all cells of the cell group) may be configured as the specific cell group. That is, a PHR for the specific cell group may be transmitted only through the specific cell group (on a PUSCH of any cell belonging to the specific cell group).

Figure 21:
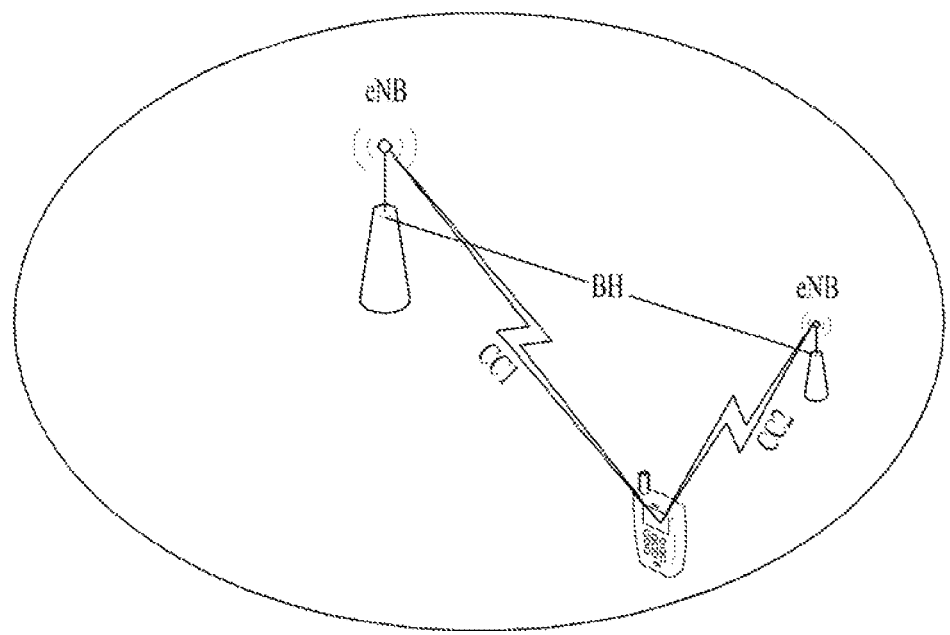
FIG. 21 illustrates an exemplary signaling method/path according to an embodiment of the present invention.

FIG. 21 illustrates an exemplary signaling method according to an embodiment of the present invention. Referring to FIG. 21, a path in which signaling related to a specific cell is performed in the situation illustrated in FIG. 20 may be limited to CC1 (group) and CC2 (group) according to the type of the signaling. Specifically, the present invention provides the following path configuration methods according to signaling types.
 Case #1
 Signaling type: command/response transmitted during RRC configuration/reconfiguration (e.g., SCell allocation/deallocation, per-cell TM configuration, and per-cell CSI feedback mode/SRS parameter configuration), RLM (e.g., RLF) and RRM measurement (e.g., RSRP or RSRQ)-related configuration/report, and HO-related command/response Signaling for a specific cell (or a specific cell group): the path may be configured as a PCell group.

Case #2

Signaling type: SCell MAC activation/deactivation message (i.e., SCell Act/De), PHRs, BSR, TACs, DCI (e.g., DL/UL grant), and a-CSI request/report Signaling for a specific cell (or a specific cell group): the path may be configured as a cell group to which the specific cell belongs (or the specific cell group). In this case, the following constraints may be imposed on the signaling.

An activation/deactivation cell list in the SCell Act/De message may include only SCells belonging to the specific cell group.

The PHRs may include only the PHR of each cell of the specific cell group. Further, a PHR transmission period may be set independently on a cell group basis.

The BSR may report only the UL buffer state of the specific cell group (or all cells of the specific cell group).

The TACs may include only per-TAG TACs of the specific cell group. Further, cells of different cell groups may not belong to the same TAG.

The DCI may be scheduling/control information (e.g., a DL/UL grant) only for a cell(s) of the specific cell group. Further, cross-CC scheduling may not be allowed between cells of different cell groups (i.e., DCI (e.g., a DL/UL grant) for a cell of the specific cell group may not be transmitted from cells belonging to other cell groups).

The a-CSI request/report may be only for a cell(s) of the specific cell group. Further, an a-CSI reporting cell set indicated by RRC signaling may be configured independently for each cell group (i.e., an a-CSI reporting cell set applied to an a-CSI request/report of the specific cell group may include only a cell(s) of the specific cell group). In addition, the number of bits of an a-CSI request field in DCI may be determined independently according to the number of cells belonging to a cell group (scheduled by the DCI) (e.g., the number of bits in the a-CSI request field is 1 bit for one cell and 2 bits for two or more cells). In another method, for every SCell group or a specific SCell group, the a-CSI request field of DCI (scheduling the SCell group) may be fixed to one bit and only each cell of the SCell group may be allowed for a-CSI reporting, in order to reduce RRC signaling overhead.

Case #3

Signaling type: ACK/NACK (A/N) for DL data, SR, and p-CSI report

Signaling for cell of PCell group: if signaling information is transmitted on a PUCCH, the path may be configured as a PCell. If signaling information is transmitted on a PUSCH (i.e., the signaling information is piggybacked to the PUSCH, that is, multiplexed with UL data), the path may be configured as the PCell group (i.e. a PUSCH transmission cell of the PCell group).

Signaling for specific SCell of SCell group: if signaling information is transmitted on a PUCCH, the path may be configured as a specific SCell or a specific selected SCell of the SCell group (e.g., a cell or one of cells configured to transmit a PDCCH (e.g., DL/UL grant) or perform (DL/UL data) scheduling in the SCell group may be determined as the specific selected SCell (by signaling), or a cell having a specific (e.g., the smallest) cell index or a specific (e.g., the broadest) system bandwidth among the corresponding cell(s) (herein, among a cell(s) for which UL resources/carriers have been defined may be automatically determined as the specific selected SCell). If signaling information is transmitted on a PUSCH (i.e., the signaling information is piggybacked to the PUSCH, that is, multiplexed with UL data), the path may be configured as the SCell group to which the specific SCell belongs. In this case, the following constraints may be imposed on the signaling.

An A/N transmitted on a PUCCH of a SCell in a SCell group may include only individual A/N responses for DL data receptions in the SCell. Because unlike a PCell, a SCell may be activated/deactivated, if a PUCCH is transmitted in a predetermined SCell of the SCell group, the predetermined SCell may be inactive at a time when an A/N is to be transmitted. Accordingly, it may be preferred (in the case of a SCell group) that an A/N for a SCell in which DL data has been received is transmitted only in the SCell. In another method, in order to reduce use of explicit PUCCH resources and the overhead of RRC signaling related to allocation of the PUCCH resources and increase the use efficiency of implicit PUCCH resources, it may be defined/regulated that an A/N for DL data reception in a specific SCell (of a SCell group) is transmitted in a cell in which a DL grant PDCCH scheduling the DL data has been transmitted.

An A/N piggybacked to a PUSCH in a specific SCell of a SCell group may include A/N responses for DL data receptions in all cells of the SCell group.

An SR transmitted on a PUCCH of a specific SCell in a SCell group may be a UL SR only for the SCell group (or all cells of the SCell group).

p-CSI transmitted on a PUCCH in a specific SCell of a SCell group may be limited to p-CSI for a specific SCell. Further, p-CSI piggybacked to a PUSCH in a SCell of a SCell group may include only p-CSI of one or more cells of the SCell group.

Case #4

Signaling type: RAR and RAR-PDCCH

Signaling for Physical Random Access Channel (PRACH) transmission in cell of PCell group: a RAR path may be configured as a PCell and a RAR-PDCCH path may be configured as a Common Search Space (CSS) in the PCell.

Signaling for PRACH transmission in specific SCell of SCell group: a RAR path may be configured as the specific SCell or a specific selected SCell of the SCell group. A RAR-PDCCH path may be configured as a CSS in the specific SCell or the specific selected SCell of the SCell group (as described before, for example, a cell or one of cells configured to transmit PDCCH (e.g., DL/UL grant) transmission or perform (DL/UL data) scheduling in the SCell group may be configured as the specific selected SCell (by signaling), or a cell having a specific (e.g., the smallest) cell index or a specific (e.g., the broadest) system bandwidth among the corresponding cell(s) (herein, among a cell(s) for which UL resources/carrier has been defined may be automatically determined as the specific selected SCell).

Compared to the above example, case #1 may be applied to SCell Act/De. In this case, paths in which MAC signaling related to activation/deactivation of a specific SCell may all be configured as a PCell group.

To avoid simultaneous transmission of a plurality of PUCCHs, a PUCCH transmitted in a SCell in case #3 may be replaced with PUSCH resources (hereinafter, referred to as UCI-PUSCH resources) or a Demodulation Reference Signal (DMRS) for PUSCH demodulation (hereinafter, referred to as UCI-DMRS). The UCI-PUSCH resources may be dedicated to UCI transmission (not UL data transmission). The UCI-PUSCH resources may include PUSCH resources configured with one subframe (hereinafter, referred to as normal PUSCH resources), PUSCH resources configured with one slot (hereinafter, referred to as slot PUSCH resources), or PUSCH resources configured with a small number of SC-FDMA symbols (hereinafter, referred to as shortened PUSCH resources). The shortened PUSCH resources may include N (e.g., N=2 or 3) SC-FDMA symbols per slot. In this case, one or two SC-FDMA symbols may be used as DMRS transmission symbols and the other one or two SC-FDMA symbols may be used as UCI transmission symbols, in each slot. Accordingly, a plurality of shortened PUSCH resources may be multiplexed (in Time Division Multiplexing (TDM)) in one UL RB (pair).

Thus, the UCI-PUSCH resources may be identified by a UL RB index, a slot index (in a UL RB), an SC-FDMA symbol index, a CS and/or OCC (combination) index of a DMRS, etc. UCI-PUSCH resources may be allocated individually for each of an A/N, an SR, and p-CSI, one common UCI-PUSCH resource may be allocated to all of the UCI, or one UCI-PUSCH resource may be allocated to two pieces of UCI (e.g., the A/N and the SR), with one UCI-PUSCH resource allocated to the other one piece of UCI (e.g., the p-CSI), which should not be construed as limiting the present invention. The UCI-PUSCH resources may be allocated preliminarily by RRC signaling. Further, a plurality of UCI-PUSCH resources may be allocated preliminarily by RRC signaling and then a specific UCI-PUSCH resource may be indicated from among the plurality of UCI-PUSCH resources by a DL grant PDCCH. Specifically, the UCI-PUSCH resource may be indicated by a specific field (e.g., an A/N Resource Indicator (ARI) field) of the DL grant PDCCH. Further, a UCI-PUSCH resource linked to a specific DL RB index (e.g., the smallest DL RB index) occupied by DL data (with linkage set/configured between DL RB resources and UCI-PUSCH resources). In addition, a UCI-PUSCH resource linked to a specific CCE index (e.g., the smallest CCE index) of a PDCCH scheduling DL data may be allocated (with linkage set/configured between CCE resources and UCI-PUSCH resources).

UCI-DMRS resources may include M (M=1, 2, or 3) SC-FDMA symbols in each slot. Unlike shortened PUSCH resources, the M symbols of the UCI-DMRS resources may all be used as DMRS transmission symbols only. UCI-DMRS resources including one slot may also be used for UCI transmission and thus a plurality of UCI-DMRS resources may be multiplexed (in TDM) in one UL RB (pair). Methods for transmitting UCI in UCI-DMRS resources may include 1) selection/transmission of different UCI-DMRS resources according to a UCI value (e.g., an ACK or NACK or a positive or negative SR) (among a plurality of UCI-DMRS resources), 2) transmission of modulation (e.g., BPSK or QPSK) DMRS symbols in UCI-DMRS resources according to a UCI value, and/or methods 1) and 2) in combination. According to method 2), a specific DMRS symbol (e.g., the first DMRS symbol) in the UCI-DMRS resources may be fixed without modulation (thus (similarly to legacy PUCCH format 2a/2b in which a CQI and an A/N are transmitted simultaneously by differential DMRS modulation), a receiver (an eNB) may receive UCI by detecting a signal difference (e.g., phase difference) between the fixed DMRS symbol and a modulated DMRS symbol).

The UCI-DMRS resources may be identified by a UL RB index, a slot index (in a UL RB), an SC-FDMA symbol index, a CS and/or OCC (combination) index, etc. Further, separate or common UCI-DMRS resources may be allocated only to an A/N and an SR and UCI-PUSCH resources may be allocated to p-CSI. The UCI-DMRS resources may be allocated preliminarily by RRC signaling. Or while a plurality of UCI-DMRS resources have already been allocated by RRC signaling, a UCI-DMRS resource to be used may be signaled by a PDCCH (e.g., an ARI field of the PDCCH). Further, a UCI-DMRS resource linked to a specific DL RB index (e.g., the smallest DL RB index) occupied by DL data or a specific CCE index (e.g., the smallest CCE index) of a PDCCH scheduling DL data may be allocated (with linkage set/configured between DL RB resources or CCE resources and UCI-DMRS resources).

The signaling path configuration method of the present invention is not limited to the afore-mentioned signaling types. For example, the signaling path configuration method of the present invention is also applicable to other signaling related to RRC/MAC/DCI/UCI, etc. For example, case #1, case #2, and case #3 may be applied to RRC signaling, MAC signaling, and DCI/UCI-related signaling, respectively.

Different cell groups may be set/configured according to signaling or signaling sets (that is, an independent cell group may be set/configured for each signaling or signaling set). Further, when different cells having different frame types (e.g., FDD and TDD frame types) or different CP lengths (e.g., normal CP and extended CP) are basically set/configured to belong to different cell groups, the signaling path configuration method of the present invention may be implemented. In this case, once a cell group is set (without an additional signaling path configuration operation), the signaling path configuration method (case #1, case #2, case #3, and case #4) of the present invention may be automatically applied.

On the other hand, a method for, for each cell, setting a cell for performing signaling (signal/channel transmission and/or reception accompanying the signaling) related/for/corresponding to the cell (without setting/configuring a cell group) may be considered. For example, the following per-cell path configuration may be possible for the afore-described signaling.

RRC Configuration/reconfiguration
    For each cell, a cell that will perform command/response transmission accompanying RRC configuration/reconfiguration (such as SCell allocation/deallocation, per-cell TM configuration, per-cell CSI feedback mode/SRS parameter configuration, etc.) for the cell may be configured.

RRM Measurement
    For each cell, a cell that will perform RRM measurement (such as RSRP or RSRQ)-related configuration/report transmission for the cell may be configured.

RLM/HO
    A cell that will perform RLM-related configuration/report and HO command/response transmission may be configured.

SCell Activation/deactivation
    For each cell, a cell that will perform activation/deactivation message transmission for the cell may be configured.

PHR/BSR/TAC
    For each cell, a cell that will perform PHR, BSR, and TAC transmission for the cell may be configured.

DCI
  For each cell, a cell that will perform DCI (such as DL/UL grant) transmission for the cell may be configured.
SR
  For each cell, a cell that will perform SR transmission for the cell may be configured.
p-CSI Report
  For each cell, a cell that will perform p-CSI report transmission for the cell may be configured.
a-CSI Request/report
  For each cell, a cell that will perform a-CSI request/report transmission for the cell may be configured.
ACK/NACK
  For each cell, a cell that will perform A/N feedback transmission for DL data received in the cell may be configured.
RAR and RAR-PDCCH
  For each cell, a cell that will perform RAR and RAR-PDCCH transmission for a PRACH received in the cell may be configured.

In another method, in the case of an HARQ-ACK for DL data, information about a cell and/or a subframe for HARQ-ACK transmission may be indicated by DL grant DCI that schedules DL data in consideration of coordination between cells (eNBs) regarding PUCCH and/or UCI transmission. Specifically, (information about) a plurality of (e.g., 2) cells/subframes are predefined/predetermined and then a cell/subframe for performing HARQ-ACK transmission for DL data may be indicated from among the plurality of cells/subframes by DL grant DCI. Further, a plurality of cells may be defined/determined as a PCell and a cell in which DL grant DCI (or DL data) has been transmitted. The plurality of subframes may be defined/determined as an HARQ-ACK transmission subframe (i.e., an original A/N SF) corresponding to a DL grant DCI (or DL data) reception subframe (determined based on a legacy HARQ-ACK timing defined in a legacy (e.g., Rel-10/11) FDD/TDD system) and the earliest UL SF (defined according to an HARQ-ACK timing) after the corresponding original A/N SF.

Similarly, in the case of a PHICH for UL data, information about a cell and/or a subframe for PHICH transmission may be indicated by DL grant DCI that schedules UL data in consideration of coordination between cells (eNBs) regarding DL control resource transmission. Specifically, (information about) a plurality of (e.g., 2) cells/subframes are predefined/predetermined and then a cell/subframe for performing PHICH transmission for UL data may be indicated from among the plurality of cells/subframes by UL grant DCI. Further, a plurality of cells may be defined/determined as a PCell and a cell in which UL grant DCI (or UL data) has been transmitted. The plurality of subframes may be defined/determined as a PHICH transmission subframe (i.e., an original PHICH SF) corresponding to a UL grant DCI (or UL data) reception subframe (determined based on a legacy PHICH timing defined in a legacy (e.g., Rel-10/11) FDD/TDD system) and the earliest DL (or special) SF (defined according to a PHICH timing) after the corresponding original PHICH SF.

A backhaul link established for the purpose of exchanging/transmitting (UE-related) information/data between cells aggregated for one UE (sites/eNBs managing/controlling the cells), including an inter-site CA (or inter-eNB CA) situation, may be configured as a non-ideal backhaul involving a great latency. If the cells (the sites/eNBs managing/controlling the cells) exchange/transmit all information/data directly only through the backhaul link in the non-ideal backhaul-based CA situation, the backhaul link may experience a great load/latency. To mitigate the load/latency, it is proposed that specific/some cell information is exchanged/transmitted between cells through a UE, taking into account the load/latency of the backhaul link and the radio channel state of the UE. In other words, the backhaul link between cells (sites/eNBs) may be replaced with a radio link between UEs. Specifically, information exchange/transmission between cells aggregated for a UE may be performed via a UE-cell radio link as follows. For the convenience, it is assumed that information related to cell 1 is transmitted to cell 2 through a UE in the case where cell 1 (e.g., CC1) and cell 2 (e.g., CC2) are aggregated for the UE, as illustrated in FIG. 21.

Alt 1: Cell 1 Command
  Cell 1 may command/indicate transmission/reporting of specific information related to cell 1 to cell 2 to the UE (by a specific DL channel/signal transmitted in cell 1).
  The UE may transmit/report the specific information related to cell 1 according to the command/indication of cell 1 (by a specific UL channel/signal transmitted in cell 2).
Alt 2: UE Report
  The UE may transmit/report specific information related to cell 1 directly to cell 2 at a specific time point or at every specific period (by a specific UL channel/signal transmitted in cell 2).
  The specific time point may be a time point when the specific information related to cell 1 is reconfigured/changed (or an appropriate time after the reconfiguration/change time).
  The specific period may be indicated by L1/L2/RRC signaling in cell 1 or cell 2.
Alt 3: Cell 2 Request
  Cell 2 may request/indicate transmission/reporting of specific information related to cell 1 to the UE (by a specific DL channel/signal transmitted in cell 2).
  The UE may transmit/report the specific information related to cell 1 according to the request/indication of cell 2 (by a specific UL channel/signal transmitted in cell 2).

Specific cell-related information to which the proposed method for signaling information between cells is applied may include at least a TM configured for a corresponding cell, a CSI feedback mode, a SRS-related parameter, an active/inactive state of the corresponding cell, a TA applied to the corresponding cell, etc. Specifically in Alt 1, cell 1 may command/indicate to a UE transmission/reporting of SRS-related parameter information configured in cell 1 (i.e., configured in cell 1 for the UE) to cell 2. Accordingly, the UE may transmit/report the SRS-related parameter information configured in cell 1 to cell 2. In Alt 2, the UE may transmit/report TA information applied to cell 1 directly to cell 2 at a time of reconfiguring/changing the TA information applied to cell 1 (i.e., the TA information applied to the UE in cell 1) (or an appropriate time point after the reconfiguration/change time). In Alt 3, cell 2 may request/indicate to the UE transmission/reporting of information about an active/inactive state about cell 1 (i.e., active/inactive state information applied to cell 1 for the UE). Accordingly, the UE may transmit/report the active/inactive state information about cell 1 to cell 2.

In non-ideal backhaul-based inter-site CA (or inter-eNB CA), [PCell, SCell]=[cell 1, cell 2] may be configured for UE 1, whereas [PCell, SCell]=[cell 2, cell 1] may be configured for UE 2. Further, UE 3 may perform communication (i.e., signal/channel transmission/reception) only through one cell (i.e., cell 1 or cell 2). In this situation, eNB 1 may allocate C-RNTI A to UE 1 that uses/operates cell 1 managed/controlled by eNB 1 as a PCell and eNB 2 may allocate C-RNTI B to UE 2 that uses/operates cell 2 managed/controlled by eNB 2 as a PCell. Cell 2 may be additionally allocated as a SCell to UE 1. If C-RNTI A and C-RNTI have the same value, ambiguity occurs between a signal/channel of UE 1 and a signal/channel of UE 2 in cell 2, thereby making normal transmission/reception impossible. In this case, although RNTIs that can be allocated to UEs may be distributed preliminarily on an eNB (cell) basis or information may be exchanged between eNBs, for allocation of an RNTI to each UE, the resulting increase in the load/latency of the backhaul may decrease RNTI allocation efficiency.

To solve this problem, it is proposed that an independent (the same or a different) RNTI is allocated/used to/for each cell (aggregated) for one UE. For example, a UE for which cell 1 and cell 2 are aggregated may perform signal/channel transmission and reception using C-RNTI A for cell 1 and using C-RNTI B for cell 2. C-RNTI A and C-RNTI B may have the same value or different values. Further, the UE may indicate C-RNTI A used for cell 1 to cell 2 and C-RNTI B used for cell 2 to cell 1. Herein, cell 1 and cell 2 may be extended to cell group 1 and cell group 2 and an independent RNTI may be allocated/used to/for each cell group. A cell group may include one or more cells and the same RNTI may be allocated/used to/for all cells of one cell group. An RNTI allocated/used to/for each cell may be at least one of an SI-RNTI, a P-RNTI, an RA-RNTI, a C-RNTI, an SPS C-RNTI, a temporary C-RNTI, a TPC-PUCCH-RNTI, a TPC-PUSCH-RNTI, and an MBMS RNTI (M-RNTI), preferably a C-RNTI. The cell group may be configured same or differently for each RNTI.

Figure 22:
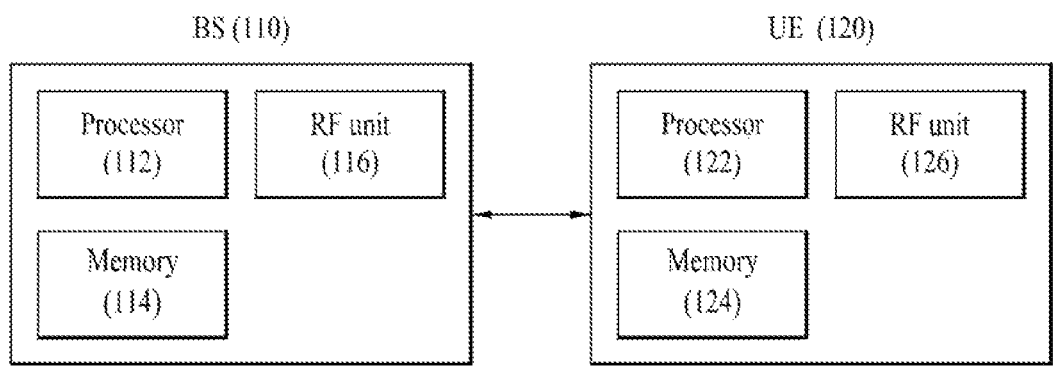
FIG. 22 is a block diagram of a Base Station (BS) and a User Equipment (UE) that are applicable to the present invention.

FIG. 22 is a block diagram of a BS and a UE that are applicable to an embodiment of the present invention. If a wireless communication system includes relays, the BS or the UE may be replaced with a relay.

Referring to FIG. 22, the wireless communication system includes a BS 110 and a UE 120. The BS 110 includes a processor 112, a memory 114, and a Radio Frequency (RF) unit 116. The processor 112 may be configured to perform procedures and/or methods proposed by the present invention. The memory 114 is connected to the processor 112 and stores various types of information related to operations of the processor 112. The RF unit 116 is connected to the processor 112 and transmits and/or receives radio signals. The UE includes a processor 122, a memory 124, and an RF unit 126. The processor 122 may be configured to perform procedures and/or methods proposed by the present invention. The memory 124 is connected to the processor 122 and stores various types of information related to operations of the processor 122. The RF unit 126 is connected to the processor 122 and transmits and/or receives radio signals. The BS 110 and/or the UE 120 may have a single antenna or multiple antennas.

The embodiments of the present invention described above are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment. It is obvious to those skilled in the art that claims that are not explicitly cited in each other in the appended claims may be presented in combination as an embodiment of the present invention or included as a new claim by a subsequent amendment after the application is filed.

In the present disclosure, a specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. In addition, the term 'terminal' may be replaced with the term 'UE', 'Mobile Station (MS)', Mobile Subscriber Station (MSS)', etc.

The embodiments of the present invention may be achieved by various means, for example, hardware, firmware, software, or a combination thereof In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means. Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a wireless communication device such as a UE, a relay, a BS, etc.

The invention claimed is:

1. A method for transmitting Uplink Control Information (UCI) by a User Equipment (UE) in a wireless communication system based on carrier aggregation, the method comprising:
configuring a first cell group having a Primary Cell (PCell);
configuring a second cell group having one or more Secondary Cells (SCells);
receiving one or more data in the second cell group; and
transmitting Hybrid Automatic Repeat reQuest (HARQ)-ACKnowledgment (ACK) information for the one or more data on a Physical Uplink Control Channel (PUCCH),
wherein if the first cell group and the second cell group are managed by the same Base Station (BS), the HARQ-ACK information is transmitted in the PCell, and if the first cell group and the second cell group are managed by different BSs, the HARQ-ACK information is transmitted in the second cell group.

2. The method according to claim 1, wherein if the first cell group and the second cell group are managed by different BSs, the HARQ-ACK information is transmitted in a SCell of the second cell group, in which the one or more data have been received.

3. The method according to claim 1, wherein if the first cell group and the second cell group are managed by different BSs, the HARQ-ACK information is transmitted in a SCell predetermined for HARQ-ACK transmission in the second cell group.

4. The method according to claim 1, wherein if the first cell group and the second cell group are managed by the same BS and data is received in two or more SCells of the second cell group, whole HARQ-ACK information for the two or more SCells is transmitted in the PCell.

5. The method according to claim 4, wherein if the first cell group and the second cell group are managed by different BSs and data is received in two or more SCells of the second cell group, HARQ-ACK information for each of the SCells is transmitted in the SCell.

6. A User Equipment (UE) for transmitting Uplink Control Information (UCI) in a wireless communication system based on carrier aggregation, the UE comprising:
 a Radio Frequency (RF) unit; and
 a processor,
 wherein the processor is configured to configure a first cell group having a Primary Cell (PCell), configure a second cell group having one or more Secondary Cells (SCells), receive one or more data in the second cell group, and transmit Hybrid Automatic Repeat reQuest (HARQ)-ACKnowledgment (ACK) information for the one or more data on a Physical Uplink Control Channel (PUCCH), and
 wherein if the first cell group and the second cell group are managed by the same Base Station (BS), the HARQ-ACK information is transmitted in the PCell, and if the first cell group and the second cell group are managed by different BSs, the HARQ-ACK information is transmitted in the second cell group.

7. The UE according to claim 6, wherein if the first cell group and the second cell group are managed by different BSs, the HARQ-ACK information is transmitted in a SCell of the second cell group, in which the one or more data have been received.

8. The UE according to claim 6, wherein if the first cell group and the second cell group are managed by different BSs, the HARQ-ACK information is transmitted in a SCell predetermined for HARQ-ACK transmission in the second cell group.

9. The UE according to claim 6, wherein if the first cell group and the second cell group are managed by the same BS and data is received in two or more SCells of the second cell group, whole HARQ-ACK information for the two or more SCells is transmitted in the PCell.

10. The UE according to claim 9, wherein if the first cell group and the second cell group are managed by different BSs and data is received in two or more SCells of the second cell group, HARQ-ACK information for each of the SCells is transmitted in the SCell.

* * * * *